(12) United States Patent
DeCorby

(10) Patent No.: US 8,977,086 B2
(45) Date of Patent: Mar. 10, 2015

(54) TAPERED WAVEGUIDE COUPLER AND SPECTROMETER

(75) Inventor: Raymond George DeCorby, Edmonton (CA)

(73) Assignee: Governors of the University of Alberta, Edmonton, Alberta (CA)

( * ) Notice: Subject to any disclaimer, the term of this patent is extended or adjusted under 35 U.S.C. 154(b) by 1365 days.

(21) Appl. No.: 12/702,952

(22) Filed: Feb. 9, 2010

(65) Prior Publication Data

US 2010/0202734 A1 Aug. 12, 2010

Related U.S. Application Data

(60) Provisional application No. 61/152,133, filed on Feb. 12, 2009.

(51) Int. Cl.

| | |
|---|---|
| *G02B 6/26* | (2006.01) |
| *G02B 6/122* | (2006.01) |
| *G01J 3/02* | (2006.01) |
| *G01J 3/44* | (2006.01) |
| *G02B 6/02* | (2006.01) |
| *G02B 6/12* | (2006.01) |
| *G01J 3/26* | (2006.01) |

(52) U.S. Cl.
CPC ............... *G02B 6/1228* (2013.01); *G01J 3/02* (2013.01); *G01J 3/0205* (2013.01); *G01J 3/0216* (2013.01); *G01J 3/0256* (2013.01); *G01J 3/4406* (2013.01); *G02B 6/02304* (2013.01); *G02B 6/12007* (2013.01); *G01J 3/26* (2013.01)
USPC ................................ 385/43; 385/14; 385/131

(58) Field of Classification Search
None
See application file for complete search history.

(56) References Cited

U.S. PATENT DOCUMENTS

| | | | | |
|---|---|---|---|---|
| 5,787,106 A | * | 7/1998 | Tabuchi et al. | 372/50.1 |
| 6,498,873 B1 | * | 12/2002 | Chandrasekhar et al. | 385/28 |
| 7,127,146 B2 | * | 10/2006 | Schmidt et al. | 385/129 |
| 7,391,949 B2 | * | 6/2008 | Schmidt et al. | 385/132 |
| 8,503,849 B2 | * | 8/2013 | Decorby | 385/131 |

OTHER PUBLICATIONS

Adams et al. 2003. Microfluidic integration on detector arrays for absorption and fluorescence micro-spectrometers. Sens. and Act. A 104: 25-31.

(Continued)

Primary Examiner — Hemang Sanghavi
(74) Attorney, Agent, or Firm — Anthony R. Lambert

(57) ABSTRACT

A method of forming a waveguide, the method comprising the steps of: forming a multilayer stack of light guiding layers; and delaminating the multilayer stack between at least two of the light guiding layers to form a waveguide between the light guiding layers; in which the patterned region has converging sides and the waveguide is tapered, the multilayer stack having increased transmissivity at a region corresponding to a selected thickness of the waveguide. A tapered waveguide is also disclosed, comprising: a multilayer stack of light guiding layers; the multilayer stack defining a channel between at least a first waveguiding layer and a second waveguiding layer; the channel having a diminishing thickness in a first direction; and at least one of the first waveguiding layer and the second waveguiding layer having a region of increased transmissivity adjacent a selected thickness of the core. Methods for the use of the tapered waveguide as an optical coupler or spectrometer are also disclosed. Methods for enhancing the optical resolution of the taper waveguide when operated as a spectrometer are also disclosed.

15 Claims, 20 Drawing Sheets

(56) References Cited

OTHER PUBLICATIONS

Babic et al. 1992. Analytic expressions for the reflection delay, penetration depth, and absorptance of quarter-wave dielectric mirrors. IEEE J. Quant. Elec. 28: 514-524.

Bacon et al. 2004. Miniature spectroscopic instrumentation: applications to biology and chemistry. Rev. Sci. Instrum. 75: 1-16.

Chigrin et al. 1999. All-dielectric one-dimensional periodic structures for total omnidirectional reflection and partial spontaneous emission control. J. Lightwave Technol. 17: 2018-2024.

Clement et al. 2006. Improved omnidirectional reflectors in chalcogenide glass and polymer by using the silver doping technique. Optics Express 14: 1789-1796.

Colin et al. 2007. Plastic folding of buckling structures. Phys. Rev. Lett. 99: 046101-1-046101-4.

Daly et al. 2000. Recent advances in miniaturization of infrared spectrometers. Proc. SPIE 3953, 70: 70-87.

DeCorby et al. 2007. Guided self-assembly of integrated hollow Bragg waveguides. Optics Express 15:3902-3915.

DeCorby et al. 2007. Robust and flexible free-standing all-dielectric omnidirectional reflectors. Adv. Mater. 19:193-196.

Delbeke et al. 2002. High-efficiency semiconductor resonant-cavity light-emitting diodes: a review. IEEE J. Sel. Top. Quant. 8:189-206.

Florjanczyk et al. 2007. Multiaperture palnar waveguide spectrometer formed by arrayed Mach-Zehnder interferometers. Optics Express 15:18176-18189.

Ghatak et al. 1987. Numerical analysis of planar optical waveguides using matrix approach. J. Lightwave Tech. LT-5: 660-667.

Goodman et al. 1984. Optical interconnections for VLSI systems. Proc. IEEE 72: 850-866.

Huang et al. 1992. The modal characteristics of Arrow structures. J. Lightwave Tech. 10: 1015-1022.

Ibanescu et al. 2003. Analysis of mode structure in hollow dielectric waveguide fibers. Phys. Rev. 67: 046608-1-046608-8.

Korbrinsky et al. 2004. On-chip optical interconnects. Intel Tech. J. 8: 129-141.

Krauss. 2007. Slow light in photonic crystal waveguides. J. Phys. D: Appl. Phys. 40:2666-2670.

Lamontagne et al. 2006. Fabrication of out-of-plane micromirrors in silicon-on-insulator planar wavelengths. J. Va. Sci. Technol. A 24: 718-722.

Lederer et al. 1991. Prismless excitation of guided waves. J. Opt. Soc. Am. A. 8: 1536-1540.

Lo et al. 2004. Semiconductor hollow optical waveguides formed by omni0directional reflectors. Optics Express 12: 6590-6593.

Miura et al. 2005. Proposal of tunable demultiplexer based on tapered hollow waveguide with highly reflective multilayer mirrors. Lasers and Electro-Optics Society, 18th Annual Meeting of the IEEE. 272-273.

Moon et al. 2004. Buckle delamination on patterned substrates. Acta Mater. 52: 3151-3159.

Morawski. 2006. Spectrophotometric applications of digital signal processing. Meas. Sci. Technol. 17: R117-R144.

Mule et al. 2002. Electrical and optical clock distribution networks for gigascale microprocessors. IEEE T. VLSI Syst. 10:582-594.

Pezeshki et al. 1994. Vertical cavity devices as wavelength selective waveguides. J. Lightwave Technol. 12:1791-1801.

Ponnampalam et al. 2007. Self-assembled hollow waveguides with hybrid metal-dielectric Bragg claddings. Optics Express 15:12595-12604.

Ponnampalam et al. 2007. Analysis and fabrication of hybrid metal-dielectric omnidirectional Bragg reflectors. Appl. Opt. 47: 30-37.

Ponnampalam et al. 2008. Out-of-plane coupling at mode cutoff in tapered hollow waveguides with omnidirectional reflector claddings. Optics Express 16: 2894-2908.

Povinelli et al. 2004. Slow-light enhancement of radiation pressure in an omnidirectional-reflector waveguide. Appl. Phys. Lett. 85: 1466-1468.

Roelkens et al. 2006. High efficiency silicon-on-insulator grating coupler based on a poly-silicon overlay. Optics Express 14: 11622-11630.

Sakurai et al. 2004. Control of group delay and chromatic dispersion in tunable hollow waveguide with highly reflective mirrors. Japan. J. Appl. Phys. 43: 5828-5831.

Schmidt et al. 2007. Performance of chip-size wavelength detectors. Optics Express 14: 9701-9706.

Tang. 1964. Delay equalization by tapered cutoff waveguides. IEEE Trans. Microwave Theory Tech. 12: 608-615.

Temelkuran et al. 2002. Wavelength-scalable hollow optical fibres with large photonic bandgaps for CO2 laser transmission. Nature 420: 650-653.

Tien et al. 1975. Radiation fields of a tapered film and a novel film-to-fiber coupler. IEEE Trans. Microwave Theory Tech. 23: 79-85.

Wang et al. 2007. Concept of a high-resolution miniature spectrometer using an integrated filter array. Optics Lett. 32: 632-634.

Wolfenbuttel. 2004. State-of-the-art in integrated optical microspectrometers. IEEE Trans. Instrum. Meas. 53: 197-202.

* cited by examiner

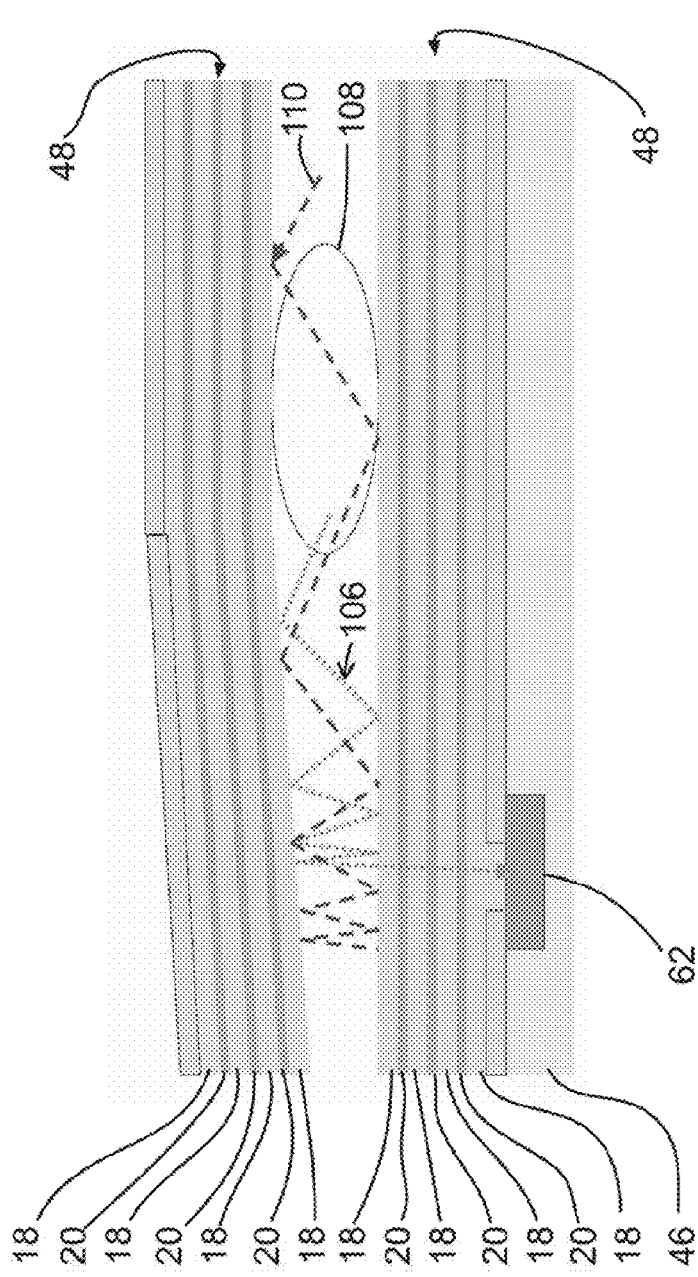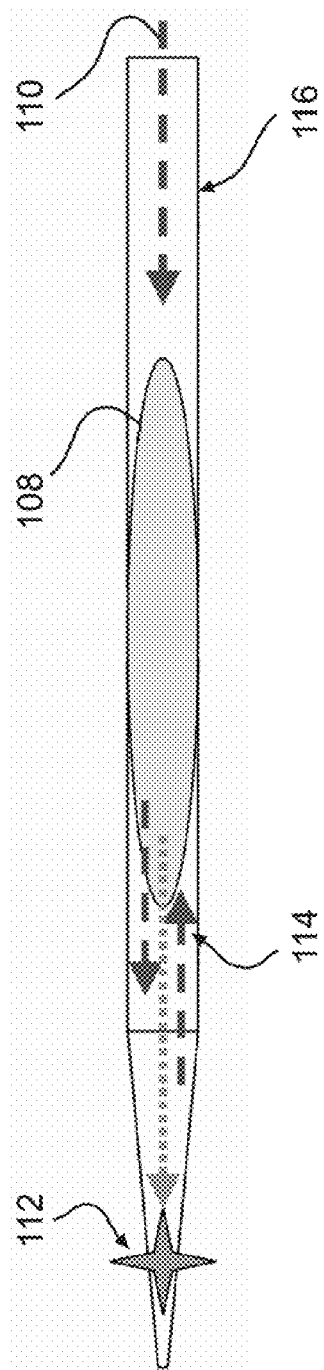

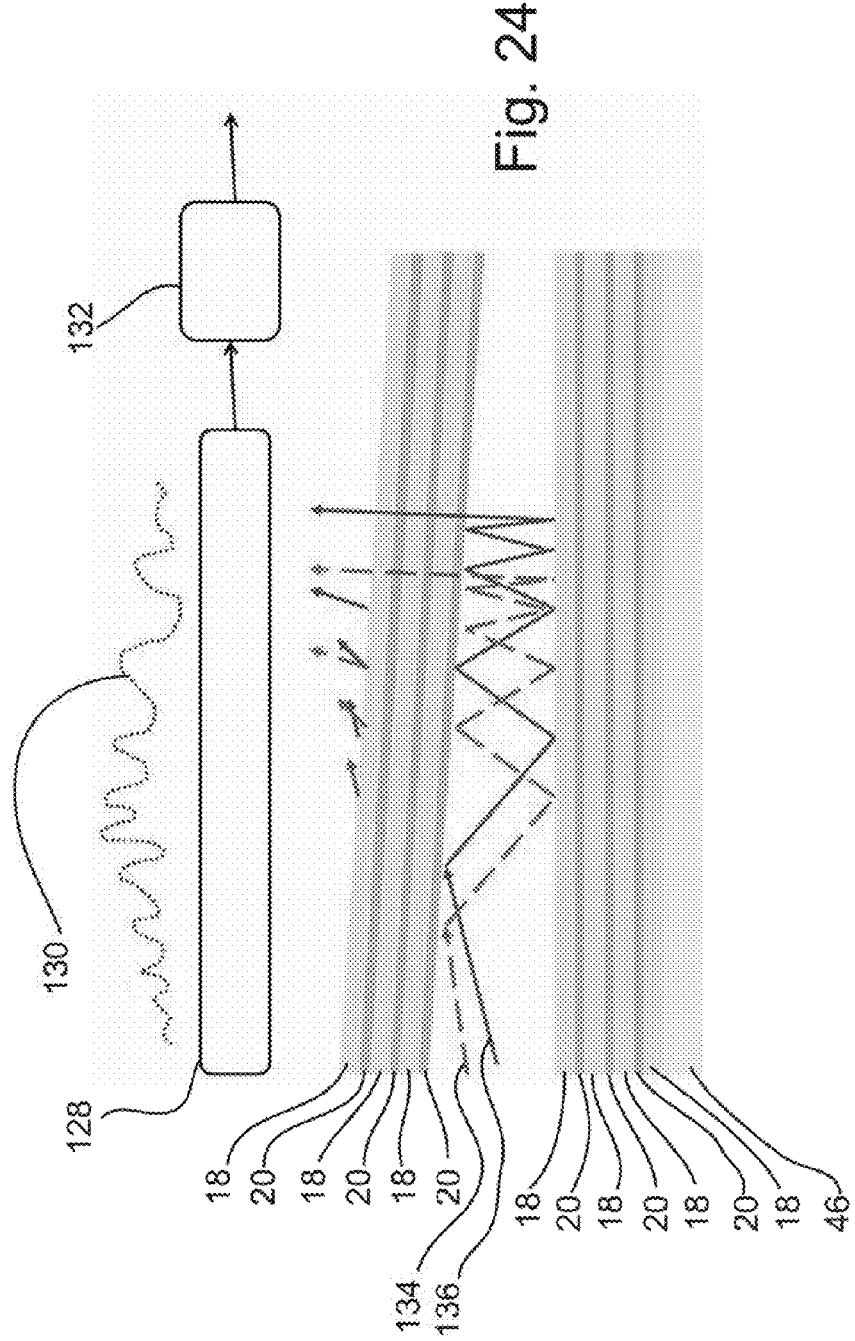

US 8,977,086 B2

TAPERED WAVEGUIDE COUPLER AND SPECTROMETER

CROSS-REFERENCE TO RELATED APPLICATIONS

This is a non-provisional of, and claims the benefit of, U.S. provisional patent application No. 61/152,133, filed Feb. 12, 2009.

TECHNICAL FIELD

This document relates to tapered waveguide couplers and spectrometers.

BACKGROUND

Bragg mirrors called omnidirectional dielectric reflectors (ODRs), have recently been used as claddings for hollow fibers and integrated waveguides. In addition, gold-terminated ODR cladding mirrors, and their fabrication (by a self-assembly buckling process), has been described elsewhere.

In conventional total internal reflection waveguides, input/output couplers based on mode cutoff in a taper were proposed and demonstrated in the 1970s. However, these couplers were not widely used for at least two reasons. First, the fabrication of planar waveguides with vertically tapered core thickness is not trivial. Second, it is necessary to orient the free-space beam along a nearly in-plane direction (i.e. parallel to the substrate), since mode cutoff occurs at the critical angle for total internal reflection between the core and one of the cladding materials. More recently, surface-normal coupling in symmetric hollow-core waveguides with Bragg reflector claddings was proposed but not experimentally demonstrated.

SUMMARY

A tapered waveguide is disclosed, comprising: a multilayer stack of light guiding layers; the multilayer stack defining a channel between at least a first waveguiding layer and a second waveguiding layer; the channel having a diminishing thickness in a first direction; and at least one of the first waveguiding layer and the second waveguiding layer having a region of increased transmissivity adjacent a selected thickness of the core.

A method of forming a waveguide is also disclosed, the method comprising the steps of: forming a multilayer stack of light guiding layers; and delaminating the multilayer stack between at least two of the light guiding layers to form a waveguide between the light guiding layers; in which the patterned region has converging sides and the waveguide is tapered, the multilayer stack having increased transmissivity at a region corresponding to a selected thickness of the waveguide A waveguide is also disclosed, comprising: a multilayer stack of light guiding layers; the multilayer stack being delaminated in a patterned region between light guiding layers, the patterned region having converging sides, the waveguide being tapered along a waveguide length; in which the multilayer stack comprises an optical path normal to the waveguide at a position along the waveguide length corresponding to a selected thickness of the waveguide.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1A: Microscope photograph showing portions of 3 adjacent hollow waveguides, with base width tapered from 80 to 20 µm. FIG. 1B: Schematic of the mask layout used to define the region of delamination for the tapers. For light-guiding experiments, the samples were cleaved part way along the tapers as indicated. FIG. 1C: Schematic cross-section (end view) of a buckled hollow channel with upper (curved) and lower cladding mirrors. Layer details are provided in the main text. FIG. 1D: Peak buckle height versus base width as determined from AFM scans at several points along a typical taper. The red line is a linear fit.

FIG. 2A: Angle-averaged reflectance versus wavelength, as predicted by a planar transfer-matrix model, for the top and bottom cladding mirrors of the as-fabricated waveguides. FIG. 2B: Reflectance versus incident angle at a wavelength of 1550 nm.

FIG. 3A: Schematic of a quasi-symmetric air-core slab waveguide with quarter-wavelength Bragg cladding mirrors and high index layers adjacent to the core. In general, N period mirrors comprising IG2 glass (n~2.55) and PAI polymer (n~1.65) were assumed. Forward and backward propagating plane-waves in the external medium and the core (both air) are indicated. FIG. 3B: Schematic of the slab model representing the as-fabricated, asymmetric waveguides. The 5.5 period bottom mirror has a low index layer adjacent to the core. In the 4 period top mirror, all the IG2 glass layers are Ag-doped (n~2.95) and the layer adjacent to the core is approximately twice as thick as the other Ag:IG2 layers. Both top and bottom mirrors were terminated by a gold layer. The ray bouncing at angle $\phi_m$ represents a low loss, leaky mode.

FIG. 4A: The core transmittance parameter $T_C$ versus incidence angle, for several core thicknesses (in µm) as indicated. The Lorentzian lines correspond to the m=0 mode in this case. FIG. 4B: The predicted effective index and attenuation versus core thickness, for the 3 lowest order modes. The vertical dotted lines indicate the cutoff thicknesses of these modes.

FIG. 5A: Schematic illustration showing a guided ray approaching normal incidence as the core is tapered to the cutoff thickness of the associated mode. The length of the arrows in the external media indicates the increased leakage of the mode with decreasing core thickness. Radiation through the bottom mirror also occurs. FIGS. 5B-D Results from the ray optics model applied to the asymmetric slab structure, representative of the as-fabricated waveguides: FIG. 5B: Transverse intensity profiles (in the air core) of the 3 lowest order modes, for a core thickness of 3 µm and a wavelength of 1600 nm. FIG. 5C: The predicted effective index and attenuation versus core thickness, for the 5 lowest order modes at 1600 nm. FIG. 5D: As in FIG. 5C, but for the 6 lowest order modes at 1520 nm. The vertical dotted lines indicate the cutoff thicknesses in each case.

FIG. 6A: $TE_{00}$, $TE_{01}$, and $TE_{02}$ modes. FIG. 6B: $TE_{10}$, $TE_{11}$, and $TE_{12}$ modes. FIG. 6C: $TE_{20}$, $TE_{21}$, and $TE_{22}$ modes.

FIG. 7A: Predicted modal effective indices versus peak core height. FIG. 7B: Predicted modal attenuation versus core thickness.

FIG. 9A: $TE_{4n}$ radiation streak. FIG. 9B: $TE_{3n}$ radiation streak. FIG. 9C: $TE_{2n}$ radiation streak. (d) $TE_{1n}$ radiation streak.

FIG. 10A: Intensity profile along the y-axis (normal to the axis of the waveguide). FIG. 10B: Intensity profile along the z-axis (parallel to the axis of the waveguide).

FIG. 12A: Typical result when the SMF is centered with respect to the taper axis. FIG. 12B: Typical result when the SMF is offset relative to the taper axis. Note that the position of the SMF along the taper is also slightly different in the two cases, so that the n=0 peaks are not coincident in wavelength.

FIG. 18. Basic concept of performing on-chip spectroscopy of an analyte embedded inside the core of a hollow waveguide. The excitation light can be separated from the emission light by using the wavelength-selective outcoupling property of a tapered waveguide section.

FIG. 19. Top view schematic of the device illustrated in FIG. 18.

FIG. 22A: A magnified image of a typical standing-wave radiation pattern leading up to the final mode cutoff position. The brightest spot at the right of the image is the cutoff point. FIG. 22B: Simulation results showing the radiated power at a fixed wavelength versus position along the taper. FIG. 22C: Simulated result showing the wavelength dependence of power radiated at a fixed position overtop the tapered waveguide. The dominant peak is at 1600 nm wavelength, corresponding to the cutoff wavelength at this position. The satellite peaks at shorter wavelength arise from light wavelengths experience cutoff at points further along the taper.

FIG. 24. The schematic illustrates the extraction of an accurate spectrum from the standing-wave interferogram in a tapered waveguide subject to mode cutoff. The inteferogram is collected by a photodetector array and delivered as raw data to a digital signal processor (DSP) or other computing engine. The DSP uses calibration data and an inverse transform algorithm to extract the corrected spectrum from the raw data.

DETAILED DESCRIPTION

Figure 1A:
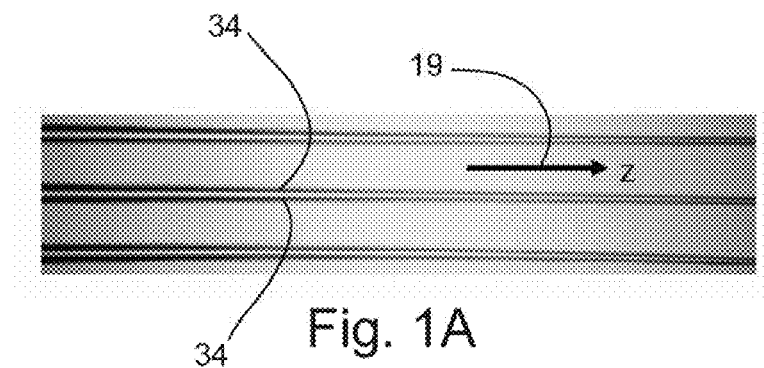
FIGS. 1A-D.

Immaterial modifications may be made to the embodiments described here without departing from what is covered by the claims.

Discussion of the relation of the two parts and description part 3 included herein:

Part 1 ("Out-of-plane coupling at mode cutoff in tapered hollow waveguides with omnidirectional reflector claddings") provides a description of out-of-plane coupling to a tapered hollow waveguide. The waveguides are based on hybrid mirrors (metal and dielectric). The last section of Part 1 describes several possible applications for the technology.

Part 2 ("Out-of-plane tapered waveguide couplers and applications") describes a design of a coupler, achieved by opening apertures in the outer metallic layers, and provides additional explanations of applications for couplers.

Description Part 3 provides a description of methods and systems of increasing the resolution of the coupler used as a spectrometer, as well as the application of the coupler for use as a stationary transform spectrometer.

Part 1: Out-of-plane coupling at mode cutoff in tapered hollow waveguides with omnidirectional reflector claddings Here we describe the theoretical and experimental analysis of light propagation in tapered, air-core waveguides with omnidirectional reflector claddings. For light within the omnidirectional band, nearly vertical out-of-plane radiation at wavelength-dependent positions along the length of the taper was observed. The coupling positions correspond to the core sizes at which individual modes approach cutoff. The leaky nature and low scattering loss of the waveguides enabled the direct imaging of modal interference and standing waves. The out-coupling experiments were corroborated by in-coupling experiments and by a theoretical analysis. The mechanism described might find application to three-dimensional optical integration, on-chip spectroscopy, and wavelength division multiplexing.

OCIS codes: (130.3120) Integrated optics devices; (160.2750) Glasses and other amorphous materials, (230.4170) Multilayers.

REFERENCES AND LINKS

1. T. F. Krauss, "Slow light in photonic crystal waveguides," J. Phys. D., Appl. Phys. 40, 2666-2670 (2007).
2. M. L. Povinelli, M. Ibanescu, S. G. Johnson, J. D. Joannopoulos, "Slow-light enhancement of radiation pressure in an omnidirectional-reflector waveguide," Appl. Phys. Lett. 85, 1466-1468 (2004).
3. Y. Sakurai, F. Koyama, "Control of group delay and chromatic dispersion in tunable hollow waveguide with highly reflective mirrors," Jap. J. Appl. Phys. 43, 5828-5831 (2004).
4. D. N. Chigrin, A. V. Lavrinenko, D. A. Yarotsky, S. V. Gaponenko, "All-dielectric one-dimensional periodic structures for total omnidirectional reflection and partial spontaneous emission control," J. Lightwave Technol. 17, 2018-2024 (1999).
5. B. Temelkuran, S. D. Hart, G. Benoit, J. D. Joannopoulos, Y. Fink, "Wavelength-scalable hollow optical fibres with large photonic bandgaps for CO2 laser transmission", Nature 420, 650-653 (2002).
6. S.-S. Lo, M.-S. Wang, C.-C. Chen, "Semiconductor hollow optical waveguides formed by omni-directional reflectors," Opt. Express 12, 6589-6593 (2004).
7. Y. Yi, S. Akiyama, P. Bermel, X. Duan, L. C. Kimerling, "Sharp bending of on-chip silicon Bragg cladding waveguide with light guiding in low index core materials," IEEE J. Sel. Top. Quantum Electron. 12, 1345-1348 (2006).
8. R. G. DeCorby, N. Ponnampalam, H. T. Nguyen, M. M. Pai, T. J. Clement, "Guided self assembly of integrated hollow Bragg waveguides," Opt. Express 15, 3902-3915 (2007).
9. N. Ponnampalam, R. G. DeCorby, "Self-assembled hollow waveguides with hybrid metaldielectric Bragg claddings," Opt. Express 15, 12595-12604 (2007).
10. G. Roelkens, D. Van Thourhout, and R. Baets, "High efficiency silicon-on-insulator grating coupler based on a poly-silicon overlay," Opt. Express 14, 11622-11630 (2006).
11. B. Lamontagne, P. Cheben, E. Post, S. Janz, D.-X. Xu, A. Delage, "Fabrication of out-of plane-micromirrors in silicon-on-insulator planar waveguides," J. Vac. Sci. Technol. A 24, 718-722 (2006).
12. P. K. Tien, G. Smolinsky, R. J. Martin, "Radiation fields of a tapered film and a novel film-to fiber coupler," IEEE Trans. Microwave Theory and Techniques MTT-23, 79-85 (1975).
13. J. W. Goodman, F. J. Leonberger, S.-Y. Kung, R. A. Athale, "Optical interconnections for VLSI systems," Proc. of IEEE 72, 850-866 (1984).
14. A. V. Mule, E. N. Glytsis, T. K. Gaylord, J. D. Meindl, "Electrical and optical clock distribution networks for gigascale microprocessors," IEEE Trans. VLSI Systems 10, 582-594 (2002).
15. F. Lederer, U. Trutschel, C. Waechter, "Prismless excitation of guided waves," J. Opt. Soc. Am. A 8, 1536-1540 (1991).
16. T. Miura, Y. Yokota, F. Koyama, "Proposal of tunable demultiplexer based on tapered hollow waveguides with highly reflective multilayer mirrors," Proc. of LEOS 2005, 272-273 (2005).
17. N. Ponnampalam, R. G. DeCorby, "Analysis and fabrication of hybrid metal-dielectric omnidirectional Bragg reflectors," Appl. Opt., in press.
18. M.-W. Moon, K.-R. Lee, K. H. Oh, J. W. Hutchinson, "Buckle delamination on patterned substrates," Acta Mater. 52, 3151-3159 (2004).
19. J. Colin, C. Coupeau, J. Grilhe, "Plastic folding of buckling structures," Phys. Rev. Lett. 99, 046101-1-4 (2007).
20. T. J. Clement, N. Ponnampalam, H. T. Nguyen, R. G. DeCorby, "Improved omnidirectional reflectors in chalcogenide glass and polymer by using the silver doping technique," Opt. Express 14, 1789-1796 (2006).
21. R. G. DeCorby, N. Ponnampalam, H. T. Nguyen, T. J. Clement, "Robust and flexible freestanding all-dielectric omnidirectional reflectors," Adv. Mater. 19, 193-196 (2007).
22. A. K. Ghatak, K. Thyagarajan, M. R. Shenoy, "Numerical analysis of planar optical waveguides using transfer matrix approach," J. Lightwave Technol. LT-5, 660-667 (1987).
23. B. Pezeshki, F. F. Tong, J. A. Kash, D. W. Kisker, "Vertical cavity devices as wavelength selective waveguides," J. Lightwave Technol. 12, 1791-1801 (1994).
24. W. Huang, R. M. Shubair, A. Nathan, Y. L. Chow, "The modal characteristics of ARROW structures," J. Lightwave Technol. 10, 1015-1022 (1992).
25. T. Tamir, "Leaky waves in planar optical waveguides," Nouv. Rev. Optique 6, 273-284 (1975).
26. A. Yariv, P. Yeh, Optical Waves in Crystals, John Wiley and Sons, New York (1984), ch. 11.
27. D. Delbeke, R. Bockstaele, P. Bienstman, R. Baets, H. Benisty, "High-efficiency semiconductor resonant-cavity light-emitting diodes: a review," IEEE J. Sel. Top. Quantum Electron. 8, 189-206 (2002).
28. D. I. Babic, S. W. Corzine, "Analytic expressions for the reflection delay, penetration depth, and absorptance of quarter-wave dielectric mirrors," IEEE J. Quantum Electron. 28, 514-524 (1992).
29. C. H. Tang, "Delay equalization by tapered cutoff waveguides," IEEE Trans. Microwave Theory and Techniques MTT-12, 608-615 (1964).
30. O. Schmidt, P. Kiesel, M. Bassler, "Concept of chip-size wavelength detectors," Opt. Express 15, 9701-9706 (2007).
31. M. Ibanescu, S. G. Johnson, M. Soljacic, J. D. Joannopoulos, Y. Fink, "Analysis of mode structure in hollow dielectric waveguide fibers," Phys. Rev. E 67, 0466081-8 (2003).

1. Introduction

In a waveguide clad by omnidirectional reflectors, there is no critical angle for the guided modes. This property enables unique functionality (not possible for waveguides based on total internal reflection (TIR) or anti-resonant reflection) such as the low-loss guiding of slow light [1-3]. Omnidirectionality is a property associated with both metallic mirrors and photonic crystal (PC) mirrors. At optical frequencies, however, metallic mirrors are absorptive and three-dimensional PCs remain challenging to fabricate. Alternatively, a one-dimensional PC can exhibit bands of omnidirectional reflection for light incident from a lower index medium [4]. Bragg mirrors with this property, called omnidirectional dielectric reflectors (ODRs), have recently been used as claddings for hollow fibers [5] and integrated waveguides [6-9].

Regardless of the guiding mechanism, efficient coupling between external beams and planar waveguide modes is a long-standing challenge. When preparation of a cleaved end facet is not practical, coupling can be realized using a prism, a diffraction grating [10], or an angled micromirror [11]. An alternative is to use a waveguide with a tapered thickness core [12], where coupling is afforded by mode radiation at cutoff. This latter technique has not been widely used, in part because controlled fabrication of vertically tapered waveguides on a planar platform requires advanced processing techniques such as gray-scale lithography. Furthermore, for waveguides based on TIR, light is radiated nearly parallel to the plane of the substrate at cutoff [12]. For interfacing to external sources, detectors, and fibers, surface-normal coupling is more convenient [10,11] and more compatible with a massively parallel input/output (I/O) coupling scheme [13, 14].

In the case of a leaky waveguide, direct coupling (i.e. without a diffraction grating or prism) between a free space beam and a quasi-guided mode is possible, provided the mode has effective index less than unity. Based on this, Lederer et al. [15] proposed a technique in which the reflectivity of a cladding mirror is locally reduced in order to facilitate I/O coupling at desired locations along a solid-core Bragg waveguide. It is worth noting that air-guided modes of a hollow waveguide satisfy the sub-unity index requirement (otherwise the field is evanescent in the air layer) and, therefore, can always be directly coupled in this way.

The coupling mechanism described here (and in [16]) can be considered a hybrid of those based on the tapered core [12] and the partially transmitting cladding [15]. When an optical mode in a tapered ODR-clad waveguide approaches its effective cutoff thickness, rays associated with that mode approach normal incidence on the cladding mirrors [1-3], a standing wave forms, and the light leakage per unit length diverges. This enables localized coupling between guided modes and normally incident free-space beams. Furthermore, since the core thickness at cutoff is wavelength dependent, these tapers also provide a mechanism for spatially dispersing a spectrally distributed light signal. In the following, we provide a theoretical and experimental basis for this behavior and suggest possible applications.

2. Brief Background and Structural Details

The waveguides discussed below have gold-terminated ODR cladding mirrors [17], and their fabrication (by a self-assembly buckling process) was described elsewhere [9]. Amongst other features, the process enabled the fabrication of low-defect, tapered hollow waveguide channels as shown in FIG. 1A. The tapered channels (tapered in both height and width [8,18]) were realized by defining linearly tapered regions of low adhesion, as shown schematically in FIG. 1B. Arrows 10 indicate a length of 80 μm, and arrows 12 indicate a length of 10 or 20 μm. The dotted line 14 indicates the cleave line, and line 16 indicates a 5 mm linear taper. For light-guiding experiments, samples were cleaved part way along the taper. This reduced the number of modes supported at the wide end, thereby simplifying the analysis to some extent.

Figure 1B:
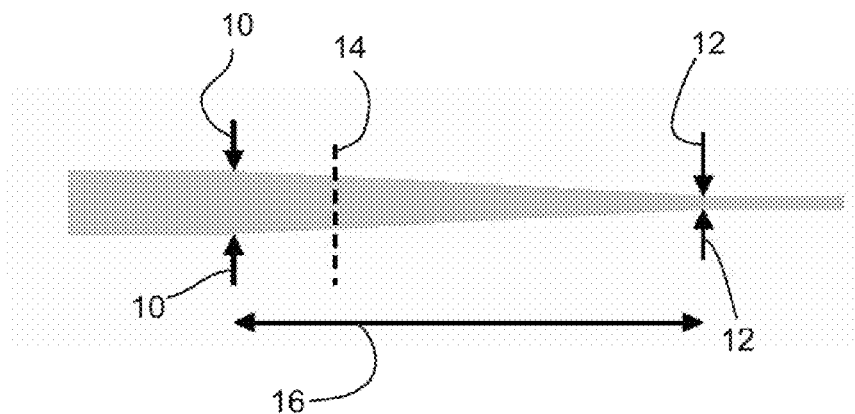
Figure 1C:
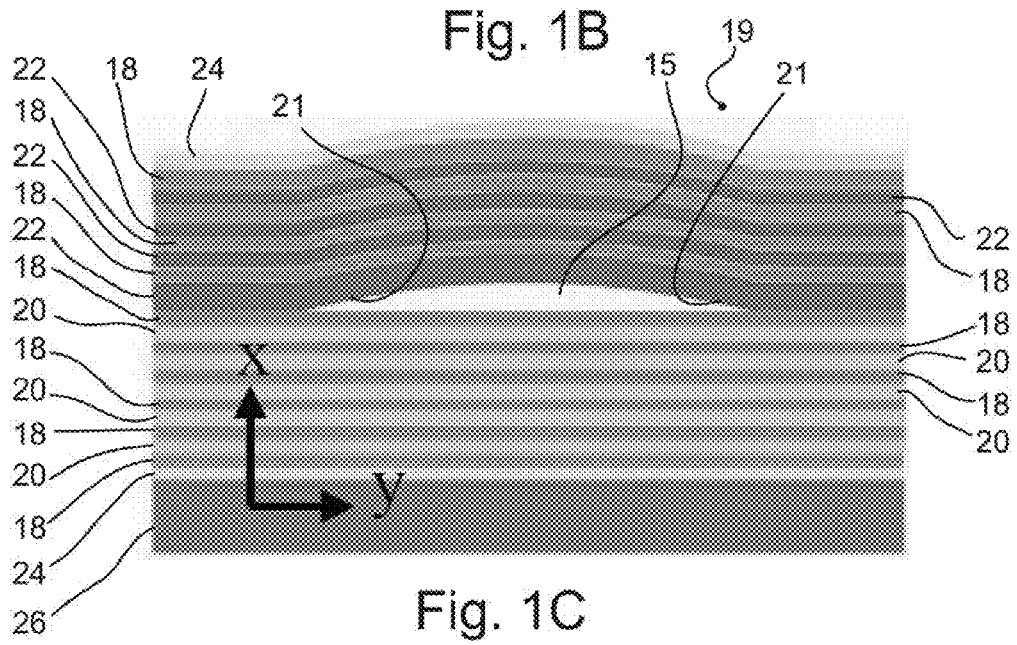

FIG. 1A illustrates a microscope photograph showing portions of 3 adjacent hollow waveguides, with base width tapered from 80 to 20 μm. FIG. 1B illustrates a schematic of the mask layout used to define the region of delamination for the tapers. For light-guiding experiments, the samples were cleaved part way along the tapers as indicated. Referring to FIG. 1C, a schematic cross-section (end view) of a buckled hollow channel with upper (curved) and lower cladding mirrors. Referring to FIGS. 1A and 1C, the core (for example channel 15) may have converging sides 21 along the first direction 19 (pointing into/out of the page in FIG. 1C). Layer details are provided in the main text. Referring to FIG. 1C, PAI layers 18, IG2 layers 20, Ag:IG2 layers 22, Au layers 24, and Si layer 26 are illustrated. (d) Peak buckle height versus base width as determined from AFM scans at several points along a typical taper. The line through the points is a linear fit.

Figure 1D:
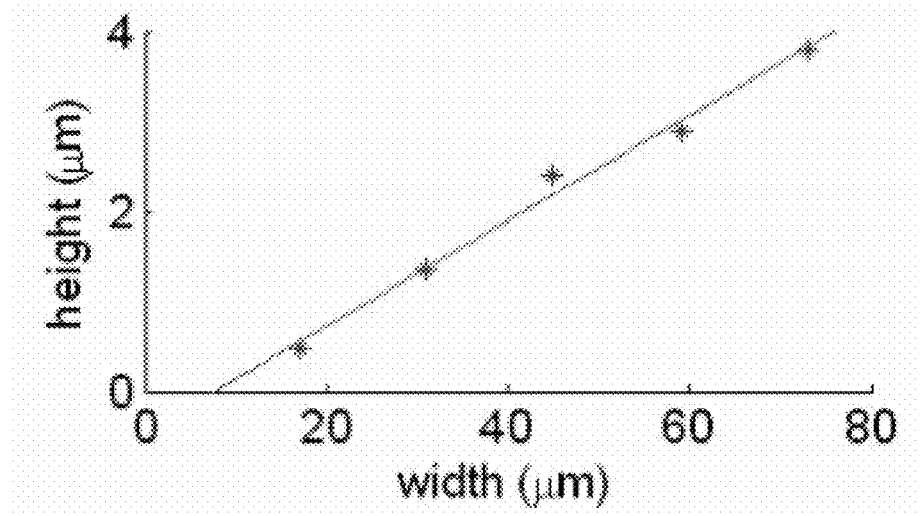

From elastic buckling theory [18], the profile of a straight-sided delamination buckle (also known as an Euler column) versus the lateral coordinate y is given by:

$$\delta(y) = \frac{\delta_{max}}{2}\left(1 + \cos\left(\frac{\pi y}{b}\right)\right), \quad (1)$$

where b is the half-width of the delaminated strip. Furthermore, the peak height of the buckle is predicted to be [18]:

$$\delta_{max} = h\sqrt{\frac{4}{3}\left(\left(\frac{b}{b_{min}}\right)^2 - 1\right)}, \quad (2)$$

where h is the height of the film (or stack of films) subject to buckling and $b_{min}$ is the minimum half-width for spontaneous buckle formation, for a given pre-buckle compressive stress resultant and for a given set of elastic film properties. It follows that for $b \gg b_{min}$, the peak buckle height is proportional to the buckle width. As discussed elsewhere [8], plastic folding [19] plays a role in the formation of our buckled waveguides, so that the elastic buckling theory is not strictly applicable. Nevertheless, AFM measurements revealed a nearly linear relationship between the peak height and the base width (see FIG. 1D). Thus, the hollow channels (arising from the delamination patterns shown in FIG. 1B) exhibit an approximately linear taper in both width and height.

The cladding mirrors are multilayer Bragg reflectors comprising polyamide-imide (PAI) polymer and $Ge_{33}As_{12}Se_{55}$ (IG2) chalcogenide glass. As discussed extensively in our previous work [8,9,20,21], these mirrors can provide low-loss, omnidirectional reflection in the near infrared. Furthermore, we recently showed [17] that termination of the mirrors by a metal layer increases their angle-averaged reflectance and omnidirectional bandwidth, while reducing the number of required layers. For the waveguides studied here (see FIG. 1C), complete details on the material and film properties can be found elsewhere [9]. Briefly, the bottom cladding is a 5.5 period Bragg mirror with ~290 nm thick PAI layers (n~1.65) and ~135 nm thick IG2 layers (n~2.55). This mirror was deposited overtop a metal (Au/Cr) bilayer (~40 nm thick). The top cladding is a Au-terminated, 4 period Bragg mirror comprising ~290 nm thick PAI layers and ~140 nm thick Ag-doped IG2 (Ag:IG2) layers (n~2.95). The first Ag:IG2 layer was made thicker (~270 nm), in part to improve the reflectance for TM polarized light at glancing incidence [8] and in part to ensure reliable delamination of the upper mirror [9].

Figure 2A:
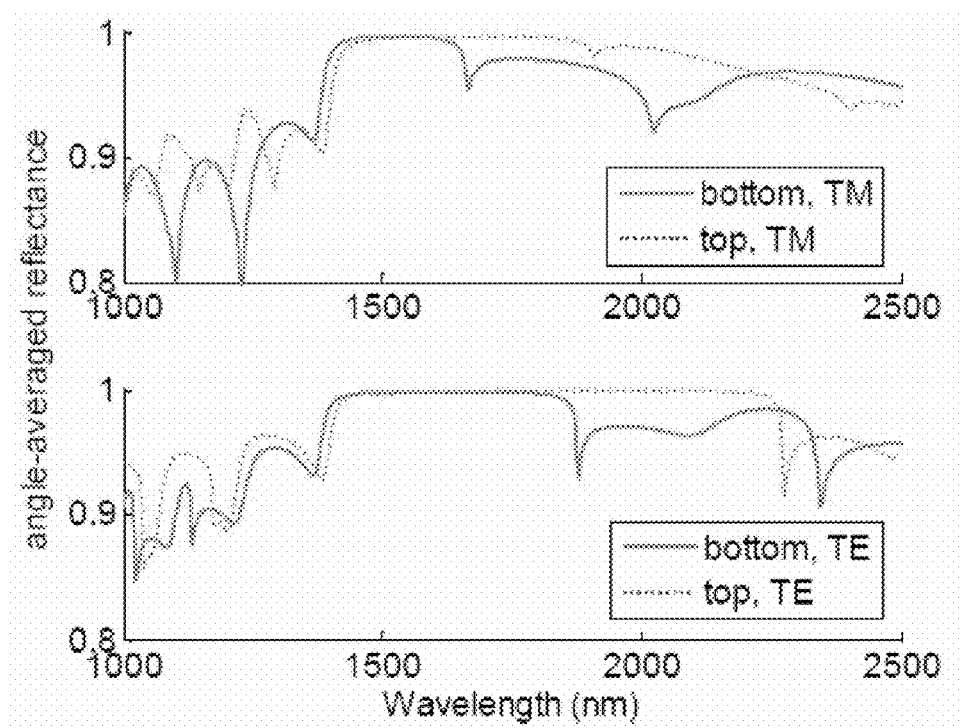
FIGS. 2A-B.
Figure 2B:
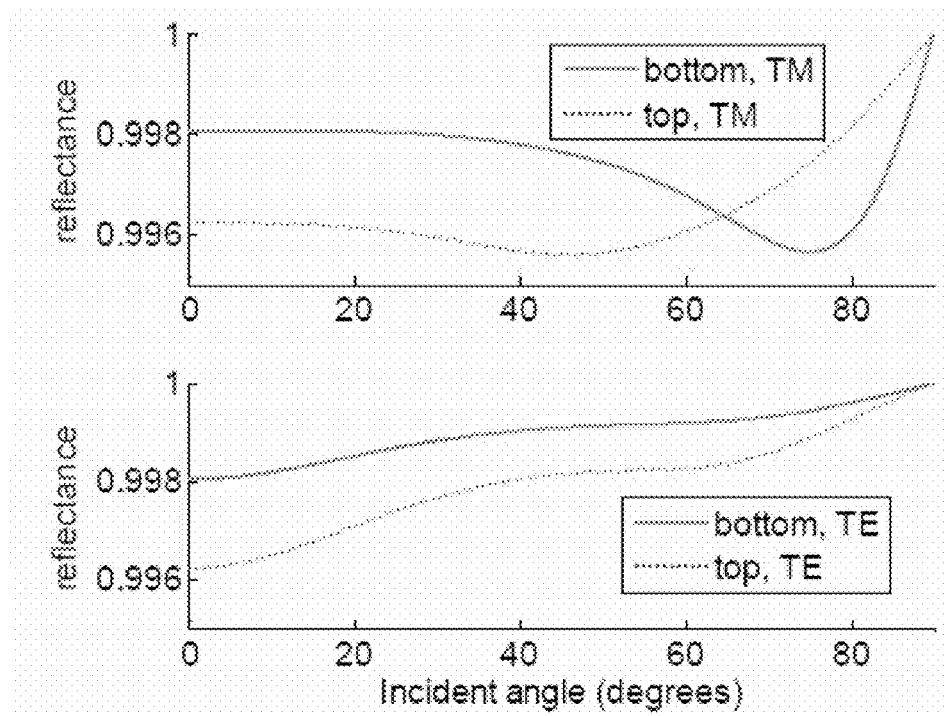

Referring to FIG. 2A, angle-averaged reflectance versus wavelength, as predicted by a planar transfer-matrix model, for the top and bottom cladding mirrors of the as-fabricated waveguides is illustrated. Referring to FIG. 2B, reflectance versus incident angle at a wavelength of 1550 nm is illustrated.

The reflectance of these mirrors, for light incident from the air core side and neglecting the curvature of the upper mirror, was predicted using transfer matrices and the material dispersion relations described elsewhere [17,20]. The wavelength-dependent, complex refractive index of Au was taken into account, but loss in the glass and polymer layers was neglected [17]. The out-of-plane coupling mechanism discussed below is dependent on omnidirectional reflection from both the top and bottom cladding mirrors. One measure of omnidirectionality is the angle-averaged reflectance [17], which is plotted versus wavelength in FIG. 2A. The mirrors exhibit a band of overlapping omnidirectionality, which for TM polarized light extends from ~1450 to ~1650 nm and for TE polarized light extends from ~1450 nm to ~1850 nm. To further illustrate, the predicted reflectance versus incidence angle at 1550 nm is plotted in FIG. 2B. For both mirrors, a high reflectance (R>0.995) is predicted for all incident angles and for both polarization states. Note that the agreement between theoretical and experimental reflectance has been consistently excellent for mirrors based on these materials [8,9,17,20,21].

3. Tapered Bragg Waveguides with Omnidirectional Claddings—Theoretical Analysis

Figure 3A:
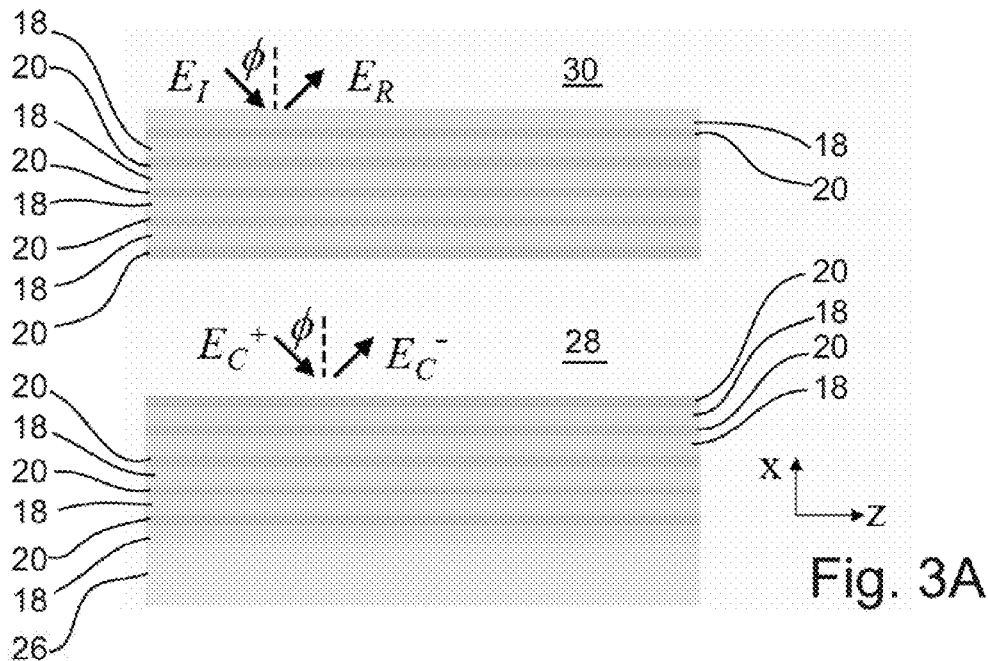
FIGS. 3A-B.
Figures 3B, 4A:
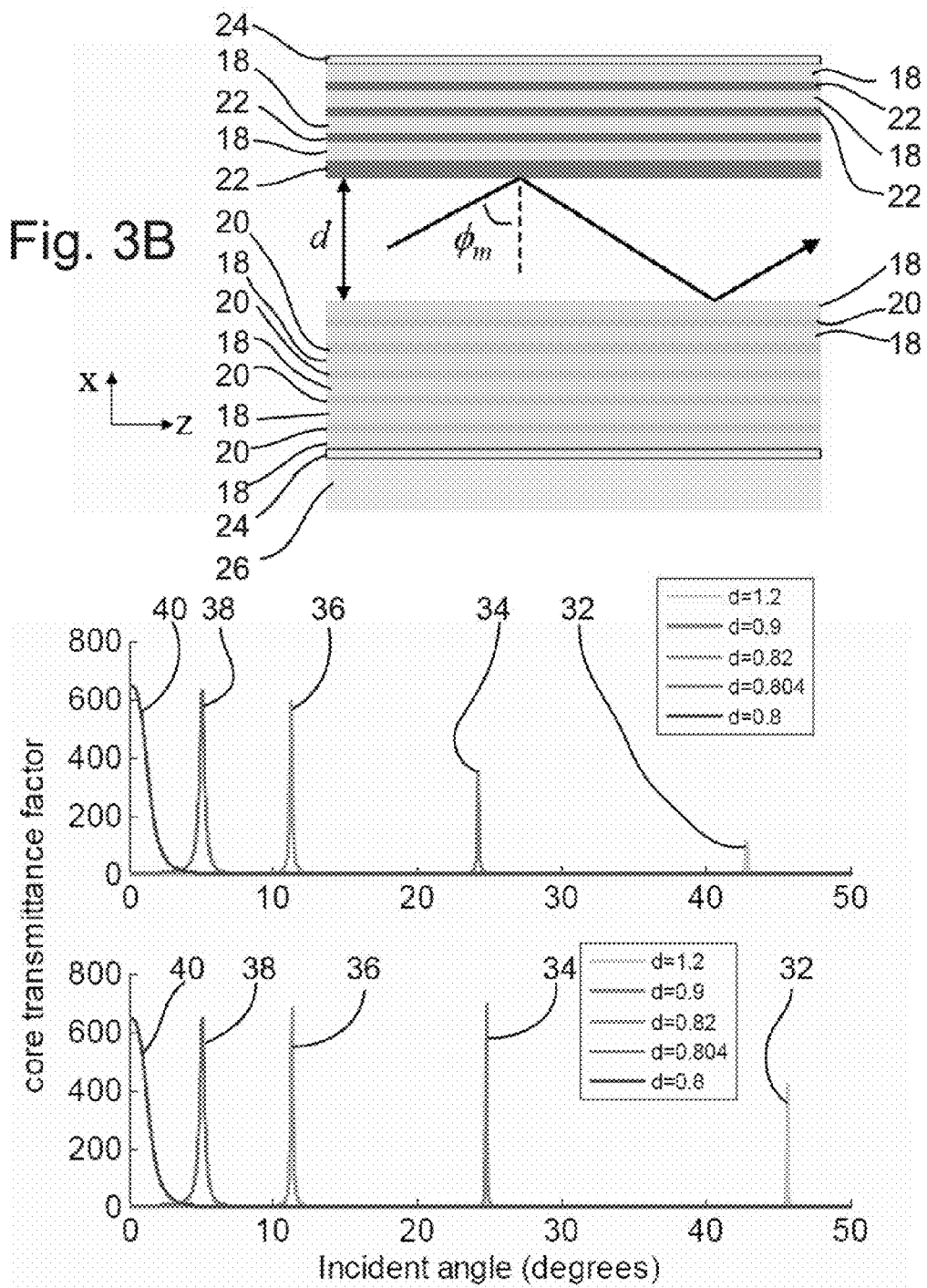
FIGS. 4A-B. Modal analysis results for the symmetric QWS slab waveguide (FIG. 3(a)), with 8 period top and bottom mirrors and at the resonant wavelength (1600 nm) of the mirrors.

We first present results from a planar (slab) model for the air-core waveguides. The slab model is a reasonable approximation to the actual waveguides, which have low height-to-width aspect ratio. Since leaky air-guided modes couple directly to external plane waves (see Section 1), modes of the slab waveguide can be solved in a straightforward way using transfer-matrices [22]. In other words, since the slab Bragg waveguide is formally equivalent to a Fabry-Perot cavity [23], the ray angles associated with low loss modes appear as dips in reflection (or peaks in transmission) versus incidence angle. We consider two different slab structures in the following discussion, as shown in FIGS. 3A and 3B. The first structure is symmetric and has Bragg mirrors tuned to be quarter-wavelength stacks (QWS) for normal incidence at 1600 nm. The second structure is representative of the as-fabricated and tested waveguides, described in detail in Section 2. We used the dispersion models described above, and again neglected loss in the glass and polymer layers.

Referring to FIG. 3A, a schematic of a quasi-symmetric air-core slab waveguide with quarter-wavelength Bragg cladding mirrors and high index layers adjacent to the core is illustrated. In general, N period mirrors comprising IG2 glass (n~2.55) and PAI polymer (n~1.65) were assumed. Referring to FIG. 3A, the air core and the air are indicated by reference numerals 28 and 30, respectively. Forward and backward propagating plane-waves in the external medium and the core (both air) are indicated. Referring to FIG. 3B, a schematic of the slab model representing the as-fabricated, asymmetric waveguides is illustrated. The 5.5 period bottom mirror has a low index layer adjacent to the core. In the 4 period top mirror, all the IG2 glass layers are Ag-doped (n~2.95) and the layer adjacent to the core is approximately twice as thick as the other Ag:IG2 layers. Both top and bottom mirrors were terminated by a gold layer. The ray bouncing at angle $\phi_m$ represents a low loss, leaky mode.

Consider propagation of an air-guided ray, as shown in FIG. 3B. For infinite period (unity reflectance) claddings, non-leaky modes exist and can be solved using the well-known phase consistency expression:

$$2 \cdot k_x \cdot d - \Phi_T - \Phi_B = m \cdot 2\pi, \tag{3}$$

where $\Phi_T$ and $\Phi_B$ are the phase shifts on reflection from the top and bottom cladding mirrors, respectively, $k_x$ is the transverse component of the propagation vector in the air core, and m is an integer (m=0, 1, 2, . . . ). While (3) has often been applied to the analysis of leaky slab waveguides [3,23], it is only approximately valid in that case. For leaky modes, both $k_x$ and $k_z$ are complex numbers, so that, strictly speaking, a self-consistency condition for both the phase and amplitude is required [24]:

$$r_T r_B \exp(-j \cdot 2 \cdot k_x \cdot d) = 1, \tag{4}$$

where $r_T$ and $r_B$ are the amplitude reflection coefficients of the top and bottom mirrors, as seen from the air core side for a given ray incident angle, and $k_x$ is a complex-valued transverse propagation constant. From solutions of (4), complex modal propagation constants are obtained as follows:

$$k_z = \sqrt{k_0^2 - k_x^2} = \beta_m - j \cdot \frac{\alpha_m}{2}, \tag{5}$$

where $k_0$ is the free-space wavenumber (applicable to the air core medium), $\beta_m = n_{eff} k_0$ determines the phase velocity of the leaky mode, and $\alpha_m$ is the intensity attenuation coefficient (due to sub-unity cladding reflectance) of the leaky mode. Furthermore, from a simple physical model that considers a ray bouncing off partially reflecting claddings, the attenuation coefficient of a leaky slab waveguide mode can be expressed as [24,26]:

$$\alpha_m = \frac{-\ln(R_T R_B)}{2 \cdot d_{eff} \cdot \tan\phi_m}, \tag{6}$$

where $n_{eff} = \sin\phi_m$, $R_T$ and $R_B$ are the reflectances from the top and bottom mirrors (for a ray incident at angle $\phi_m$), and $d_{eff}$ is the effective core thickness accounting for field penetration into each cladding mirror.

As discussed above, a straightforward transfer-matrix approach can be used to solve for modes in an air-core slab waveguide. As indicated in FIG. 3A, Snell's law requires that a plane wave incident from air will propagate with the same angle inside the core. Thus, the modes of the slab waveguide correspond to modes of the equivalent Fabry-Perot cavity. By plotting the plane wave transmission versus incident angle (i.e. versus $\beta = k_0 \sin\phi$), modal solutions ($\phi_m$) correspond to peaks in the core transmittance parameter (see FIG. 3A):

$$T_C = \left|\frac{E_C^+}{E_I}\right|^2. \tag{7}$$

The peaks in $T_C(\beta)$ are Lorentzian lineshape functions [22] centred at $\beta = \beta_m$. Furthermore, the FWHM (2Γ) of the line is equal to the radiation loss coefficient of the mode (i.e. $\alpha_m = 2\Gamma$).

Modal analysis of the structures in FIGS. 3A and 3B was carried out as follows. First, the plane wave response of the overall structure was calculated as a function of incident angle, using a relatively coarse step size. Mode positions were identified as peaks in $T_C$, and then the plane wave response versus incidence angle was recalculated using a much finer step size in the vicinity of these modes. The mode parameters ($\phi_m$, etc.) were then extracted from $T_C(\beta)$ as discussed above. Subsequently, $r_T(\phi_m)$ and $r_B(\phi_m)$ were determined using transfer matrices applied to each mirror separately, and (5) and (4) were used to verify the mode solutions. As a final check for consistency, we calculated the modal attenuation based on (6), as follows. Using $\phi_m$ determined in the previous steps, transfer matrices were used to obtain $R_T(\phi_m)$ and $R_B(\phi_m)$ and also to obtain the effective core thickness, given by [27]:

$$d_{eff} = d + L_T + L_B = d + \frac{\lambda_0}{4\pi}\left(\frac{-\partial(\arg(r_T))}{\partial(\cos\phi)}\right) + \frac{\lambda_0}{4\pi}\left(\frac{-\partial(\arg(r_B))}{\partial(\cos\phi)}\right), \quad (8)$$

where $L_T$ and $L_B$ are the phase penetration depths [28] into the top and bottom mirrors, respectively. We found nearly perfect agreement between the attenuation calculated using (8) and (6) and that calculated from the FWHM of the line-shape functions.

It is illustrative to first consider the symmetric slab waveguide structure with QWS mirrors, shown in FIG. 3A. In FIG. 4A, $T_C$ is plotted versus incident angle for several different core thicknesses and with 8 periods assumed for both the top and bottom mirrors. For clarity, core thickness was restricted to the single mode range (d<1.6 μm). For this structure, the bounce angle of the fundamental (m=0) mode approaches normal incidence on the cladding mirrors as the core thickness approaches $d=d_0=\lambda_0=\lambda_2=0.8$ μm. This limit represents mode cutoff, where both the phase velocity and attenuation of the mode diverge (see FIG. 4B). Furthermore, as cutoff is approached the group velocity reduces [3] and, in the case of perfectly reflecting mirrors, the radiation pressure on the claddings (for fixed input power) diverges [2]. In general, the cutoff condition of the m$^{th}$ order mode is given by $d_m=(m+1)\lambda_0/2=d_0+m\lambda_0/2$. In other words, the cutoff conditions are the mirror separations at which the equivalent Fabry-Perot cavity exhibits a normal-incidence resonance at the wavelength of interest. It is also interesting to note that the TE and TM modes become degenerate near cutoff [2,3], implying the potential for the coupling mechanism to be polarization independent.

Figure 4B:
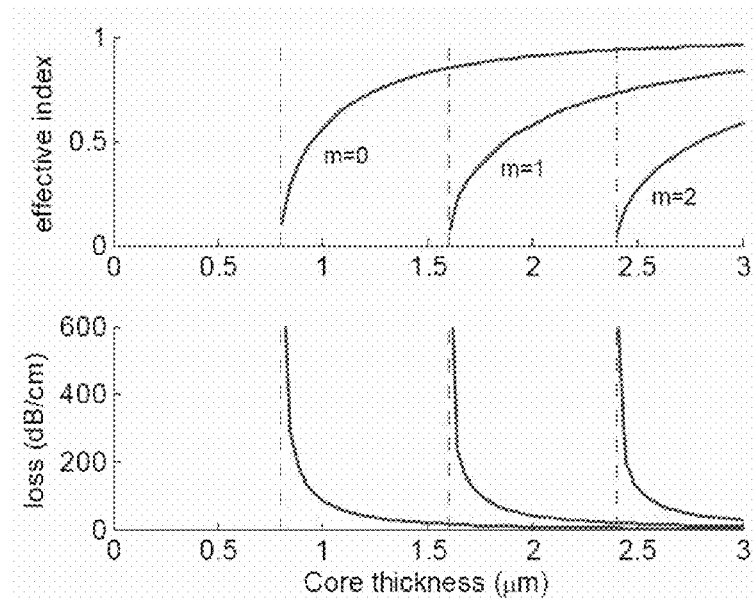

TM TE, m=0, 1, 2, legend numerals. FIGS. 4A-4B illustrate the modal analysis results for the symmetric QWS slab waveguide (FIG. 3A), with 8 period top and bottom mirrors and at the resonant wavelength (1600 nm) of the mirrors. Referring to FIG. 4A, the core transmittance parameter $T_C$ versus incidence angle, for several core thicknesses (in μm) as indicated is illustrated. The Lorentzian lines correspond to the m=0 mode in this case. The upper graph of FIG. 4A illustrates the TM mode, while the lower graph of FIG. 4A illustrates the TE mode. The d values of d=1.2m d=0.9, d=0.82, d=0.804, and d=0.8 are denoted in FIGS. 4A and 4B by the reference numerals 32, 34, 36, 38, and 40, respectively. Referring to FIG. 4B, the predicted effective index and attenuation versus core thickness, for the 3 lowest order modes is illustrated. The vertical dotted lines indicate the cutoff thicknesses of these modes.

In keeping with the results of FIGS. 4A and 4B, a $\lambda_0/2$ cutoff condition is often cited for the fundamental mode of a hollow Bragg waveguide [3]. However, this condition applies only when the normal incidence resonance of the slab structure is not affected by field penetration into the cladding mirrors. For Bragg mirrors, this is only true at the specific wavelength for which the layers (of both top and bottom mirrors) are tuned to have quarter-wave thickness at normal incidence [28], as was the case in [3]. A $\lambda_0/2$ cutoff condition for the fundamental mode also applies in the idealized case of lossless metallic mirrors [2], where the penetration into the mirrors is zero. In all other cases, an effective core thickness (incorporating penetration into the mirrors) must be used to assess the normal incidence resonance condition.

Figure 5A:
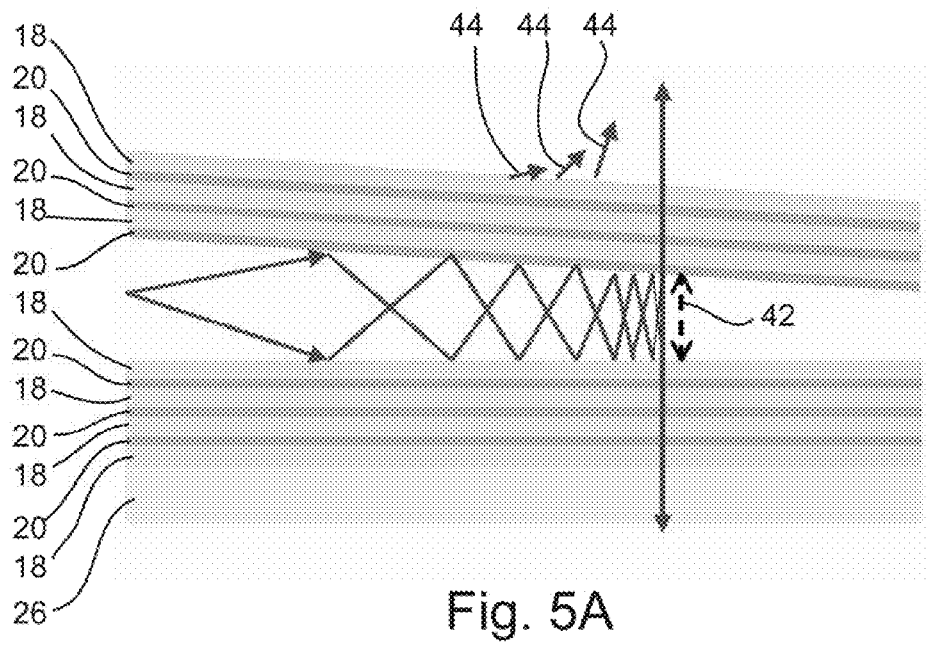
FIGS. 5A-D. Results from a first-order analysis of radiation at cutoff in a tapered, ODR-clad slab waveguide.

From the analysis above, we can make some approximate predictions regarding the propagation of light inside a tapered-core hollow waveguide. As shown in FIG. 5A, the rays associated with a given mode approach normal incidence in the vicinity of the cutoff thickness. From (6) and assuming omnidirectional mirrors, the divergence in the loss can be attributed to the divergence in the number of ray bounces per unit length near cutoff. At cutoff, the mode is equivalent to a normal incidence resonance of the slab structure, and remaining power is radiated in a surface-normal direction. Of course, the ray picture neglects key features of the process. For example, since the mode propagation constant becomes increasingly complex near cutoff (and purely imaginary beyond cutoff), some mode power is also reflected in the backwards direction. Thus, a standing wave is expected to form, as is well known from the treatment of analogous tapered waveguides (with conducting metal walls) in the microwave regime [29]. Nevertheless, the gross details of the ray optics model are consistent with finite difference simulations of a similar structure by Miura et al. [16].

Figure 5B:
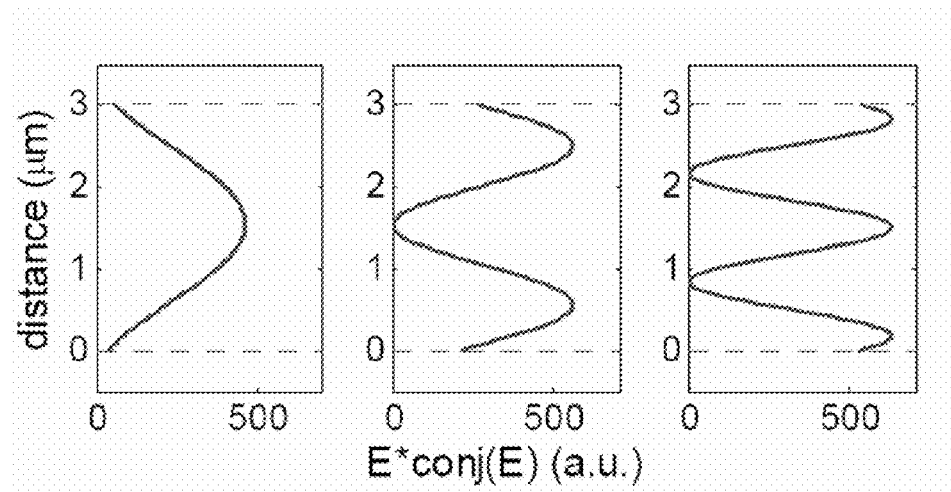
Figure 5C:
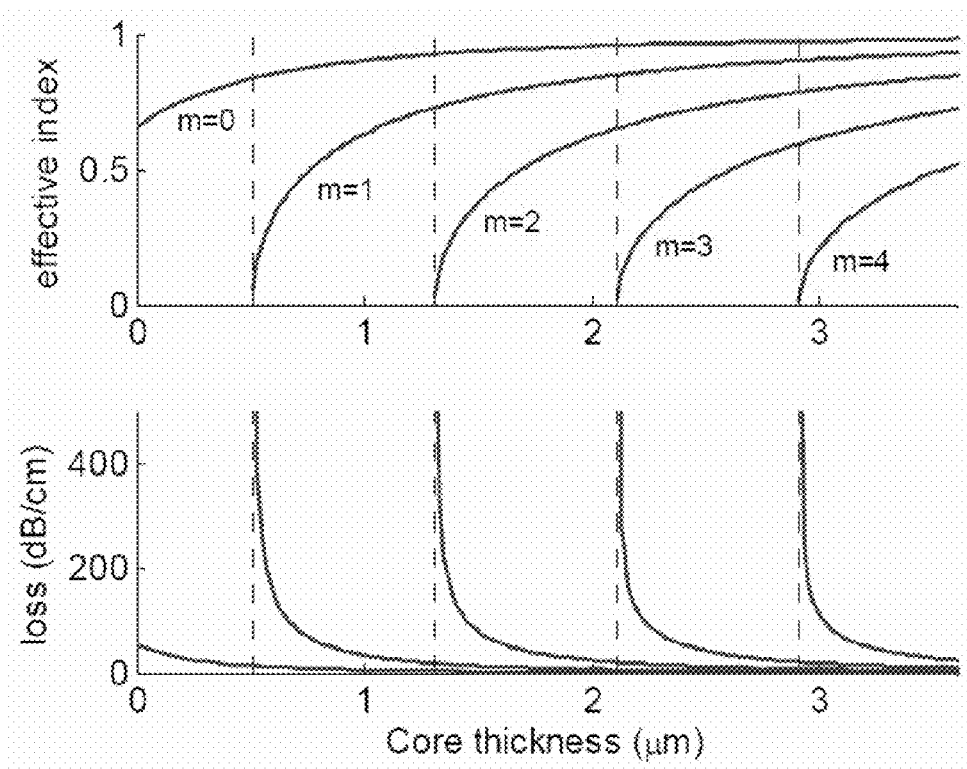
Figure 5D:
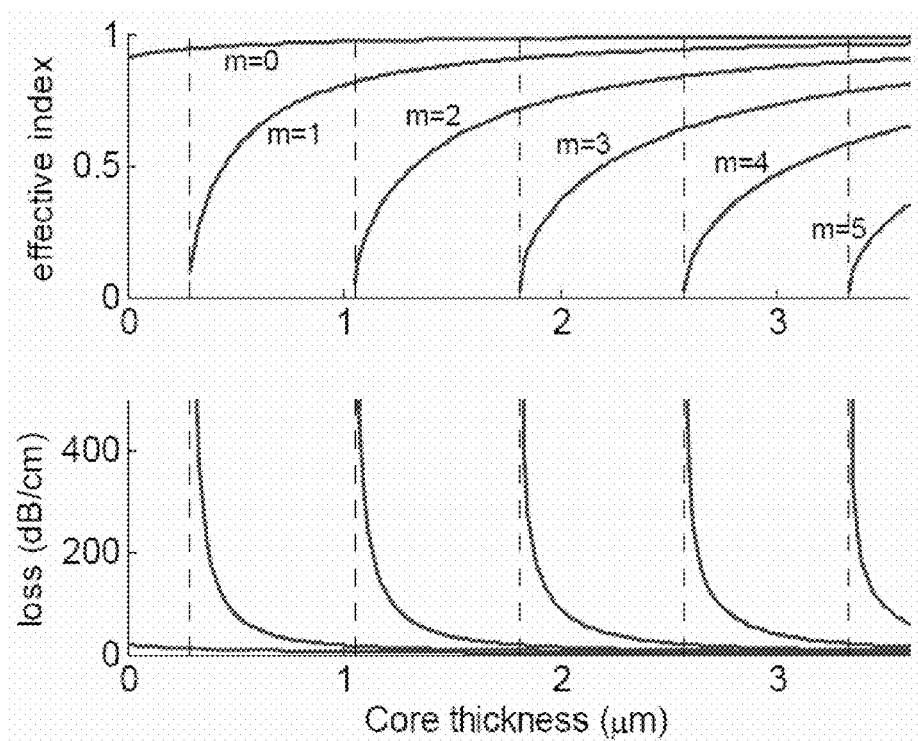

Results from the slab model representing the as-fabricated waveguides (FIG. 3B) are plotted in FIG. 5B-5D. The transverse intensity profiles of the 3 lowest order modes are plotted in FIG. 5B, for a core thickness of 3 μm and a wavelength of 1600 nm. The evolution of the modal effective indices and radiation loss with decreasing core thickness are plotted in FIGS. 5C and 5D, for a wavelength of 1600 and 1520 nm, respectively. For the asymmetric waveguide, the fundamental 'air-guided' mode exists even for vanishing air-core thickness (i.e. there is no cutoff condition related to a reduction in the separation of the cladding mirrors). This is mainly due to the thicker Ag:IG2 layer in the top mirror, which plays the role of a cavity defect when the two mirrors are brought into contact. It should be emphasized that we are referring only to 'air-guided', leaky modes with $n_{eff}<1$ in the present analysis. The Bragg structure also supports index guided modes with $n_{eff}>>1$ (especially centered on the thick Ag:IG2 layer). Also, since absorption in the Ag:IG2 layers was neglected, the loss of the m=0 mode is underestimated for vanishing mirror separation.

Referring to FIGS. 5A-D, results from a first-order analysis of radiation at cutoff in a tapered, ODR-clad slab waveguide are illustrated. Referring to FIG. 5A, a schematic illustration showing a guided ray approaching normal incidence as the core is tapered to the cutoff thickness 42 of the associated mode is detailed. The length of the arrows 44 in the external media indicates the increased leakage of the mode with decreasing core thickness. Radiation through the bottom mirror also occurs. FIGS. 5B-5D illustrate results from the ray optics model applied to the asymmetric slab structure, representative of the as-fabricated waveguides: Referring to FIG. 5B, transverse intensity profiles (in the air core) of the 3 lowest order modes, for a core thickness of 3 μm and a wavelength of 1600 nm is illustrated. Referring to FIG. 5C, the predicted effective index and attenuation versus core thickness, for the 5 lowest order modes at 1600 nm is illustrated. Referring to FIG. 5D, as in FIG. 5C, but for the 6 lowest order modes at 1520 nm is illustrated. The vertical dotted lines indicate the cutoff thicknesses in each case.

Unlike the fundamental mode, the higher-order air-guided modes do exhibit a cutoff thickness. Furthermore, their divergence in phase velocity and attenuation near cutoff is similar to the results shown in FIGS. 4A and 4B. As for the QWS case, the cutoff thicknesses of subsequent modes are spaced by $\lambda_0/2$ (i.e. $d_m = d_{m-1} + \lambda_0/2$). This is due to the fact that the normal-incidence field penetration into each mirror is invariant with respect to the mirror separation. The results for $\lambda_0 = 1600$ nm are plotted in FIG. 5C, showing $d_1 \sim 0.51$ μm, $d_2 \sim 1.31$ μm, etc. The results for $\lambda_0 = 1520$ nm are plotted in FIG. 5D, showing $d_1 \sim 0.29$ μm, $d_2 \sim 1.05$ μm, etc.

Figure 6A:
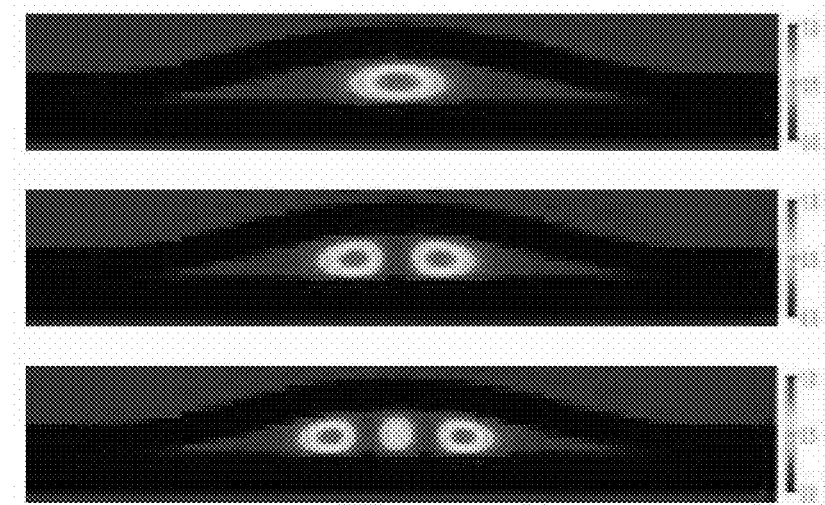
FIGS. 6A-C. Selected low-order mode field profiles predicted by a commercial, two-dimensional finite difference mode solver are shown (not to scale), for a buckled waveguide with 67 µm base width and 3.5 µm peak core height. The wavelength was set to 1600 nm.
Figure 6B:
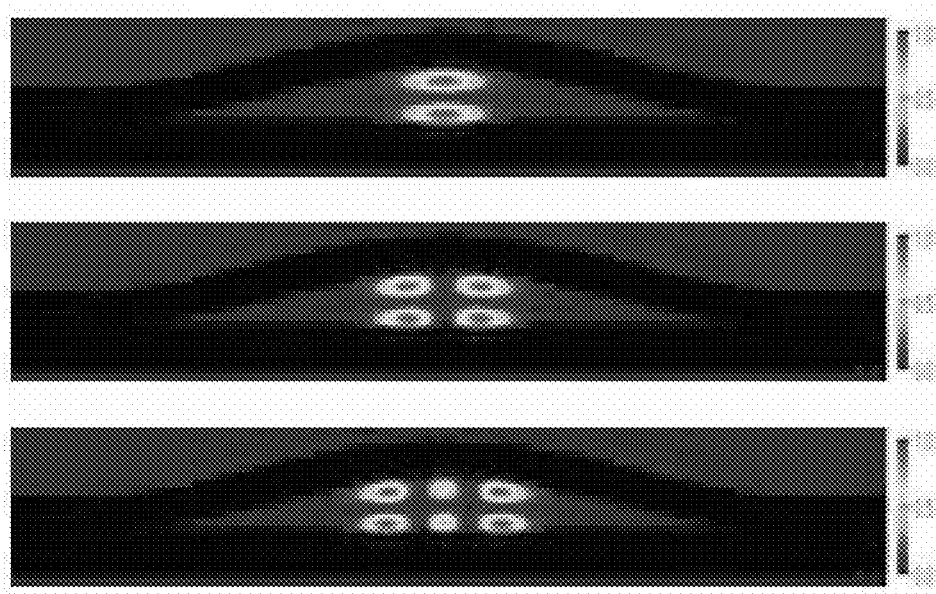
Figure 6C:
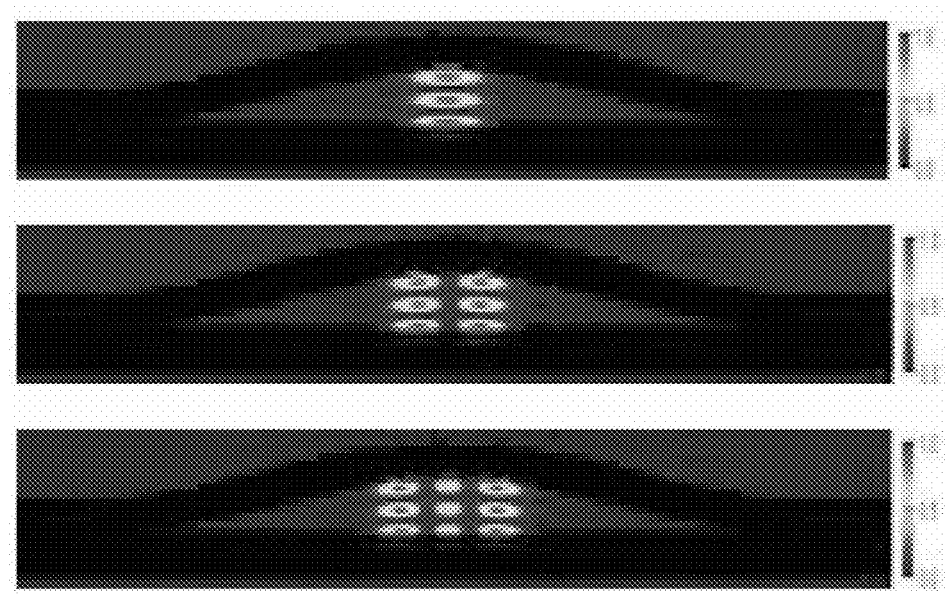

Since the real waveguides have a buckled shape and provide two-dimensional confinement, we used a commercial finite-difference mode solver (ModeSolutions 2.0, Lumerical Solutions, Inc.) to augment the ray optics results. This software provides mode field profiles, radiation loss, and dispersion for arbitrary (two-dimensional) leaky waveguide structures. We assumed a raised cosine profile (see (1)) for the buckle waveguides and used the same layer thicknesses and material properties as described above. All of the results shown were obtained for a wavelength of 1600 nm and for TE polarization. FIGS. 6A-6C show several mode field profiles predicted for a peak core height of 3.5 μm and base width 67 μm, representative of the large end of a cleaved taper. As expected from the slab analysis, this core size supports modes with multiple lobes in the vertical direction. Furthermore, the lateral confinement splits each vertical (transverse) mode into a family of lateral sub-modes. In the following, the modes are referred to by a $TE_{mn}$ ($TM_{mn}$) labeling convention, where (m+1) indicates the number of lobes (i.e. anti-nodes inside the air core) in the transverse (x) direction and (n+1) indicates the number of lobes in the lateral (y) direction.

FIGS. 6A-6C illustrate selected low-order mode field profiles predicted by a commercial, two-dimensional finite difference mode solver (not to scale), for a buckled waveguide with 67 μm base width and 3.5 μm peak core height. The wavelength was set to 1600 nm. Referring to FIG. 6A, $TE_{00}$, $TE_{01}$, and $TE_{02}$ modes are illustrated. Referring to FIG. 6B, $TE_{10}$, $TE_{11}$, and $TE_{12}$ modes are illustrated. Referring to FIG. 6C, $TE_{20}$, $TE_{21}$, and $TE_{22}$ modes are illustrated.

To support the conclusions regarding mode cutoff from the ray optics model, we obtained finite difference solutions for a range of core sizes. We used peak heights and base widths obtained from AFM measurements as input to the simulator. Some of these results are plotted in FIGS. 7A and 7B, showing that the variation in the effective index and radiation loss is in good agreement with the ray optics model (compare to FIG. 5C).

Figure 7A:
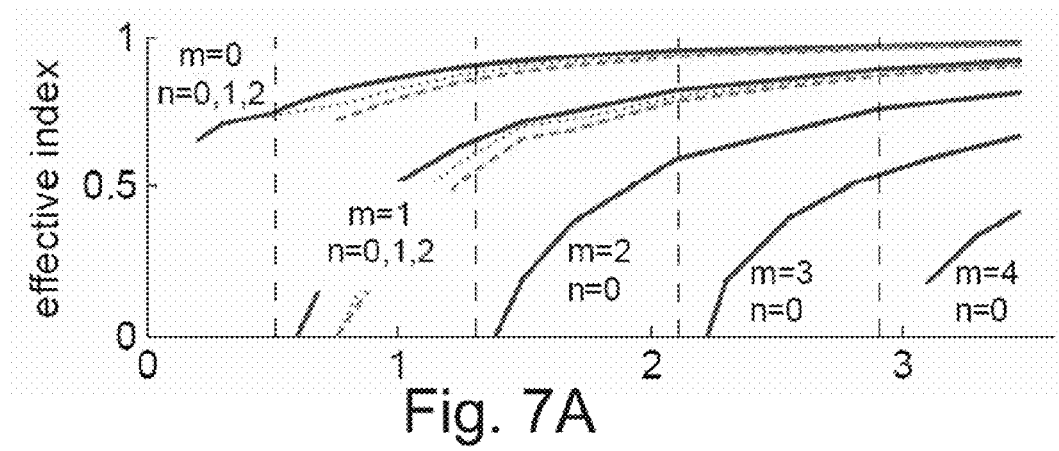
FIGS. 7A-B. Selected results from the finite difference mode solver are shown, for a wavelength of 1600 nm. In each figure, the dashed vertical lines are the cutoff thicknesses predicted by the ray optics model for an equivalent thickness slab waveguide.
Figure 7B:
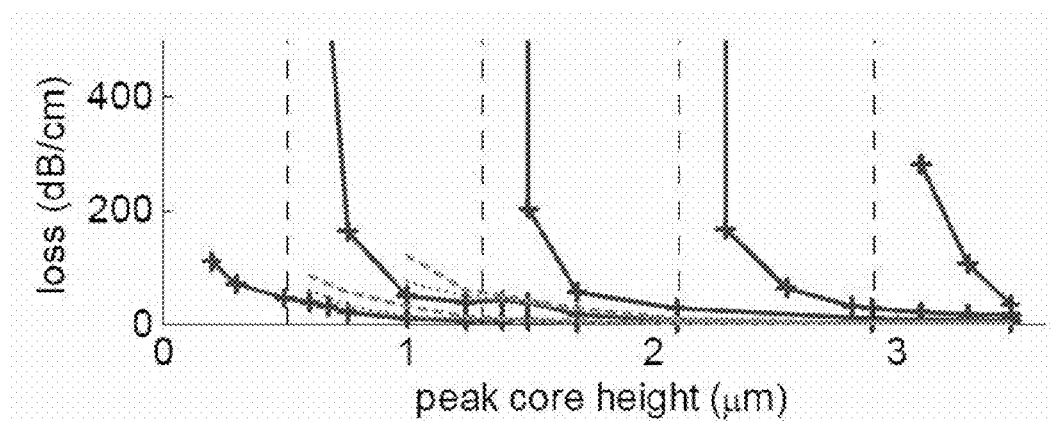

Referring to FIGS. 7A-7B, selected results from the finite difference mode solver are illustrated, for a wavelength of 1600 nm. In each figure, the dashed vertical lines (Refs) are the cutoff thicknesses predicted by the ray optics model for an equivalent thickness slab waveguide. Referring to FIG. 7A, predicted modal effective indices versus peak core height is illustrated. Referring to FIG. 7B, predicted modal attenuation versus core thickness is illustrated.

Because of the lateral confinement, each vertical mode from the ray optics model becomes a family of modes in the two-dimensionally confining structure. To illustrate this, the effective index and radiation loss curves for the lowest 3 horizontal sub-modes are plotted for m=0 and m=1 in FIG. 8A. In fact, ~10 low-loss horizontal sub-modes are predicted for the first few vertical mode families. Furthermore, the horizontal sub-modes are closely spaced in effective index, as expected from the large width of the buckle waveguides relative to their peak height. Within a given vertical mode family (i.e. for fixed m), modes with higher lateral mode number exhibit higher loss and attain cutoff for a larger core thickness. This is as expected, since at cutoff $\beta = k_z = 0$ and $k_x^2 + k_y^2 = k_0^2$.

Higher mode number n implies a higher value of $k_y$, and therefore a smaller value for $k_x$ at the cutoff point.

4. Experimental Results—Outcoupling

Figure 8:
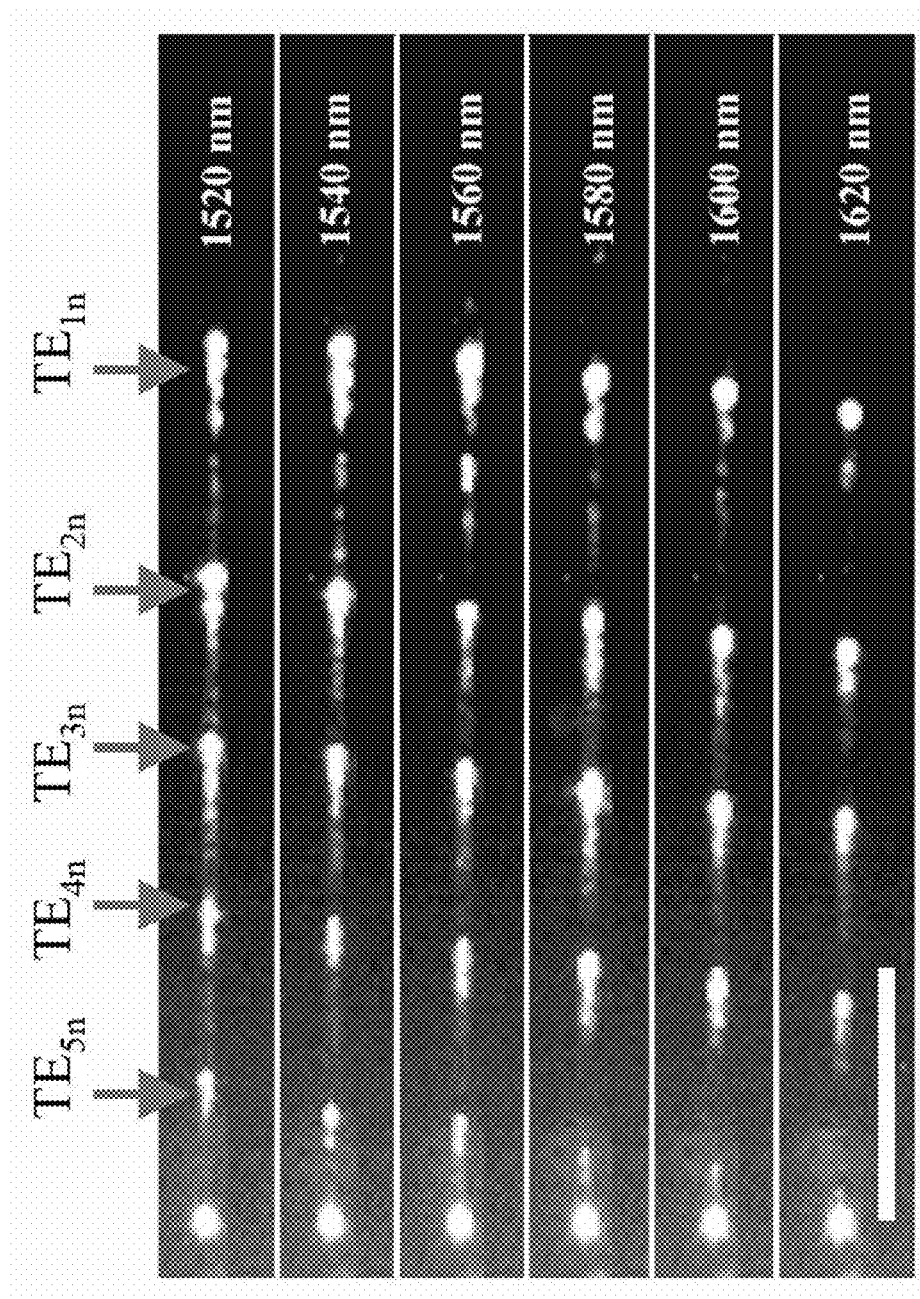
FIG. 8. Outcoupling results from a hollow Bragg waveguide, with base width tapered from ~67 μm to ~10 μm. Light from a tunable laser was coupled into the large end of the taper, at the left of each image. Outcoupling streaks are attributed to radiation of 4 or 5 (depending on wavelength) vertical mode families, as indicated. Scale bar: 1 mm.

In initial experiments, light (~1 mW launch power) from a tunable diode laser was passed through a fiber-based polarization controller and launched (either via a high NA fiber or an objective lens) into the large end of various tapers. The light radiated/scattered by the tapered waveguide was observed using an infrared camera attached to a microscope. All of the results discussed below are for TE polarized light, as verified by monitoring the light transmitted in the m=0 modes (which do not experience cutoff, as discussed above) at the output facet of the taper. Similar results were obtained for TM polarized light, and we verified that the coupling positions are approximately independent of polarization state. This is due to the degeneracy of the TE and TM modes at cutoff, as discussed in Section 3. FIG. 8 is a series of images showing the light radiated from a typical taper, at several wavelengths in the 1520-1620 nm range. From AFM and microscope measurements, the large end of the taper was estimated to have a base width of ~67 μm and a peak core height of ~3.5 μm. The bright spot at the left of each image is the input coupling point. The bright, elongated streaks to the right of the input coupling point occur at wavelength-dependent positions along the length of the taper. From the discussion in Section 3 and below, these streaks can be attributed to out-of-plane radiation of light at mode cutoff. In fact, each streak corresponds to the radiation of a particular 'family' of modes with a shared transverse mode number m.

FIG. 8 illustrates outcoupling results from a hollow Bragg waveguide, with base width tapered from ~67 μm to ~10 μm. Light from a tunable laser was coupled into the large end of the taper, at the left of each image. Outcoupling streaks are attributed to radiation of 4 or 5 (depending on wavelength) vertical mode families, as indicated. Scale bar: 1 mm.

In excellent agreement with the ray optics model (FIGS. 5A-5D), 5 radiation streaks were observed at 1520 nm wavelength but only 4 streaks for wavelengths beyond 1600 nm. As expected, the coupling positions move towards the large end of the taper with increasing wavelength. For the taper shown, this shift corresponds to a spatial dispersion of ~500 nm/mm, which is 1-2 orders of magnitude higher than that provided by conventional wedge filters [23,30].

We captured high magnification images of the individual out-coupling streaks shown in FIG. 8, by positioning a 60× microscope objective lens in close proximity to the surface of the tapered waveguides. This setup enabled the direct imaging of modal interference and standing wave patterns, as shown in FIGS. 9A-9D. On close inspection, each elongated streak in FIG. 8 is actually an intricate standing wave pattern. Our interpretation of these patterns is as follows. Towards the left of a given streak (i.e. towards the large end of the taper), numerous individual modes within the associated vertical mode family are approaching cutoff. Each of these modes is subject to back-reflection and a diverging radiation loss. The interference of these forward and backward propagating mode components creates a pattern of bright radiation spots. Moving to the right along the same streak, the standing wave pattern becomes less complex as, one by one, the modes with higher horizontal order reach their cutoff point. By making slight changes to the input coupling conditions and the wavelength, it was generally possible to isolate the cutoff point of the first 3 or 4 horizontal modes. For example, the cutoff points for the $TE_{31}$ and $TE_{30}$ modes are clearly identifiable in the image shown in FIG. 10B. In every case, the right-most portion of the elongated streak is a simple (single-lobed) standing wave pattern, arising from the interference of the forward and backward propagating $TE_{m0}$ modes. A final spot, typically somewhat brighter than the preceding spots, is observed at the right-most position of each streak. We call this the 'terminal' cutoff point.

Figure 9A:
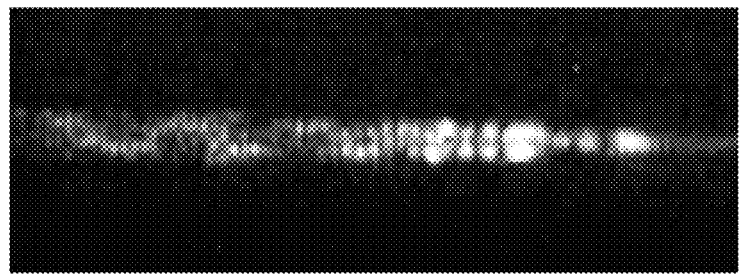
FIGS. 9A-D. High magnification images of the radiation streaks from FIG. 8 are shown, for a wavelength of 1600 nm. The images appear in order of position along the taper.
Figure 9B:
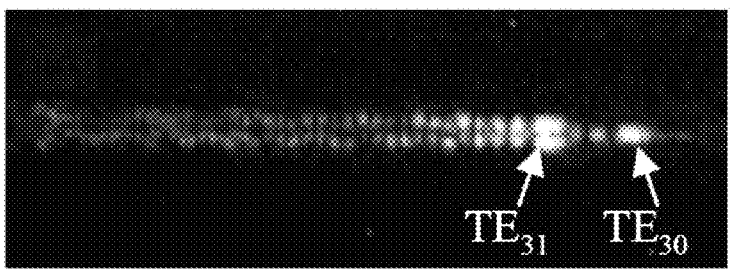
Figure 9C:
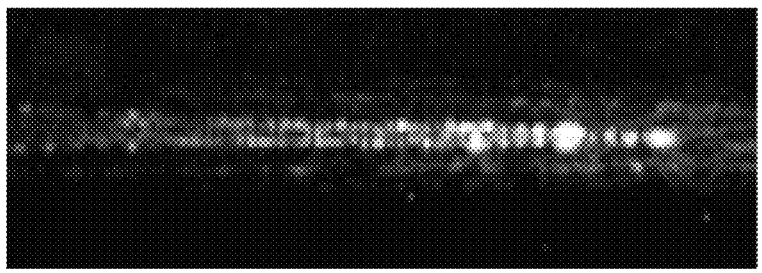
Figure 9D:
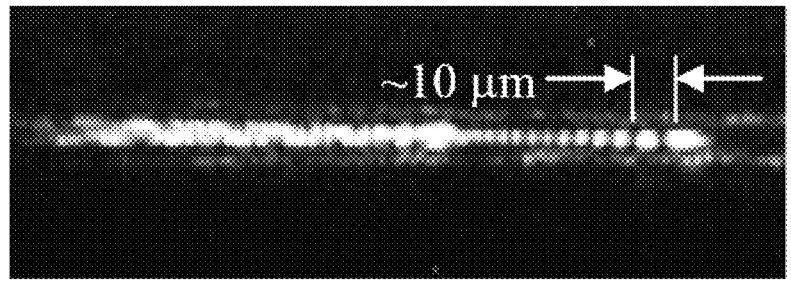

FIGS. 9A-9D illustrate high magnification images of the radiation streaks from FIG. 8, for a wavelength of 1600 nm. The images appear in order of position along the taper. Referring to FIG. 9A $TE_{4n}$ radiation streak is illustrated. Referring to FIG. 9B, $TE_{3n}$ radiation streak is illustrated. Referring to FIG. 9C, $TE_{2n}$ radiation streak is illustrated. Referring to FIG. 9D, $TE_{1n}$ radiation streak is illustrated.

From the period of the standing waves ($\Lambda_{SW}$) in FIGS. 9A-9D, it is possible to estimate the effective index of the $TE_{m0}$ modes at cutoff (i.e. $\lambda_0 = 2n_{eff}\Lambda_{SW}$. We typically observed a 'terminal' standing wave period of ~10 μm (see FIG. 3B), corresponding to $n_{eff}$~0.08. In other words, the ray angle at cutoff is estimated to be approximately 5 degrees from normal. Light radiated prior to the terminal point emerges at slightly larger angles (see FIG. 5A), so that a distribution of angles will contribute to the far-field image of each radiation streak.

Figure 10A:
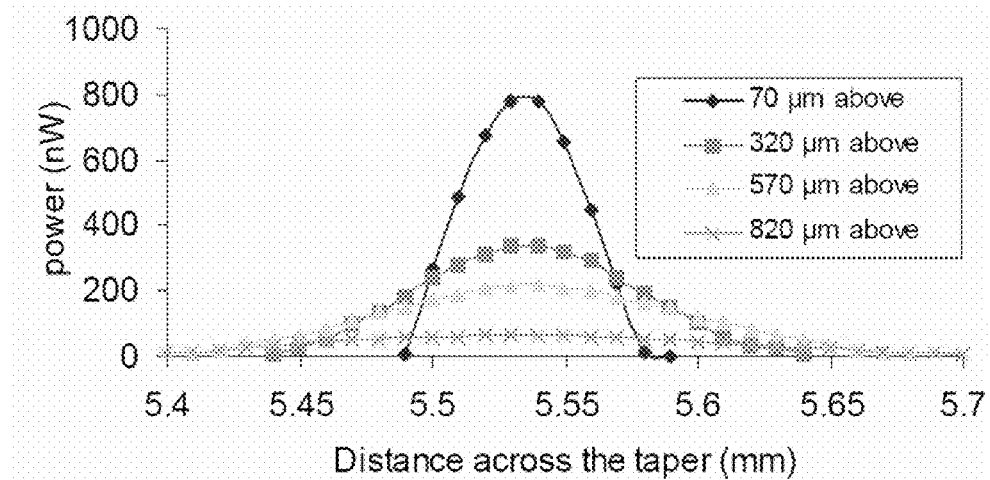
FIGS. 10A-B. Typical far-field profiles of the light radiated at cutoff, as picked up by a MMF probe scanned at various fixed heights above the sample surface. The case shown is for the $TE_{2n}$ radiation streak of an 80-10 μm taper.
Figure 10B:
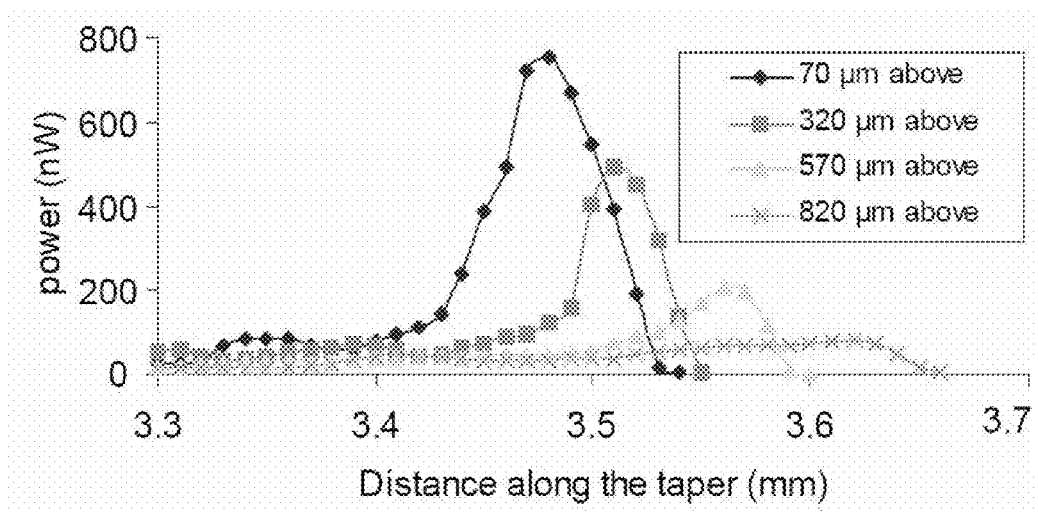

We conducted a preliminary analysis of the far-field radiation patterns, by collecting the radiated light with a multimode fiber (MMF). In this experiment, the fiber was attached to a micropositioner and aligned approximately normal to the surface of the samples. The fiber was scanned in a two-dimensional plane at fixed heights above the sample, and the collected power at each point was monitored by a photodetector attached to the other end of the fiber. The mode fields estimated in this way are a convolution of the fiber aperture and the actual emitted radiation pattern, so that the spot size is overestimated. Typical results are shown in FIGS. 10A-10B. The radiation patterns were symmetric in the direction perpendicular to the waveguide axis (across the taper), which is expected from the symmetry of the waveguide. Furthermore, the radiation pattern typically exhibited a divergence angle of 5-10 degrees in the x-y plane.

Scans along the z-axis (see FIG. 10B) revealed a slightly asymmetric beam, whose direction (defined by mapping the peak of the beam versus height above the waveguide) was typically 5-10 degrees off of normal to the sample surface, towards the direction of the output facet (i.e. towards the small end of the taper). The asymmetry and the slightly off-normal direction of the beam are both consistent with the simple model put forward in FIG. 5A. Guided light radiates quite efficiently in the section of waveguide leading up to the nominal cutoff point, so that the rays producing much of the radiated beam are approaching but not exactly aligned with the surface normal. Encouragingly, the effective beam angle is in good agreement with the angle estimated from the standing wave patterns in FIGS. 9A-9D. Given the standing waves observed, both forward and backward propagating light will contribute to the far-field radiation pattern. However, forward propagating light clearly makes the dominant contribution.

FIGS. 10A-10B illustrate typical far-field profiles of the light radiated at cutoff, as picked up by a MMF probe scanned at various fixed heights above the sample surface. The case shown is for the $TE_{2n}$ radiation streak of an 80-10 μm taper. Referring to FIG. 10A, an intensity profile along the y-axis (normal to the axis of the waveguide) is illustrated. Referring to FIG. 10B, an intensity profile along the z-axis (parallel to the axis of the waveguide) is illustrated.

It is somewhat difficult to assess the efficiency of the coupling mechanism for the present samples, since the 1 mW launch power is split between 5-6 vertical mode families. As shown in FIGS. 10A-10B, the peak power collected by the MMF probe was ~1 μW, or <0.1% of the total input power. However, the tapers used here are far from optimized for coupling purposes. The outer metallic layers of the cladding mirrors were designed to reduce radiation loss, and are thicker than the skin depth of gold in the near infrared (~25 nm). Thus, a significant amount of light is lost in transmission through these layers. There is a possibility for resonant tunneling effects, and a full understanding would require a 3-dimensional numerical simulation. It should also be noted that the experiment only collects light emitted through the top mirror, while a similar amount of power is radiated through the bottom mirror. In practice, a completely reflective (or opaque) mirror could be used to suppress radiation in one direction. Furthermore, the reflectance/opacity of the other mirror could be reduced at locations where efficient radiation is expected and desired, such as by a patterned removal of the Au termination layer. Clearly the geometry of the taper could be customized to ensure that only a select number of modes are supported. Finally, the mode cutoff properties can be controlled through proper design of the cladding mirrors, as discussed in Section 3.

It is expected that the spot size, the divergence angle, and the wavelength dispersion can all be customized to some extent through judicious choice of the mirror reflectance and the slope of the taper [16]. A full 3-dimensional simulation of these structures would be a useful improvement to the simple models presented here, but is left for future work.

5. Experimental Results—Incoupling

Figure 11:
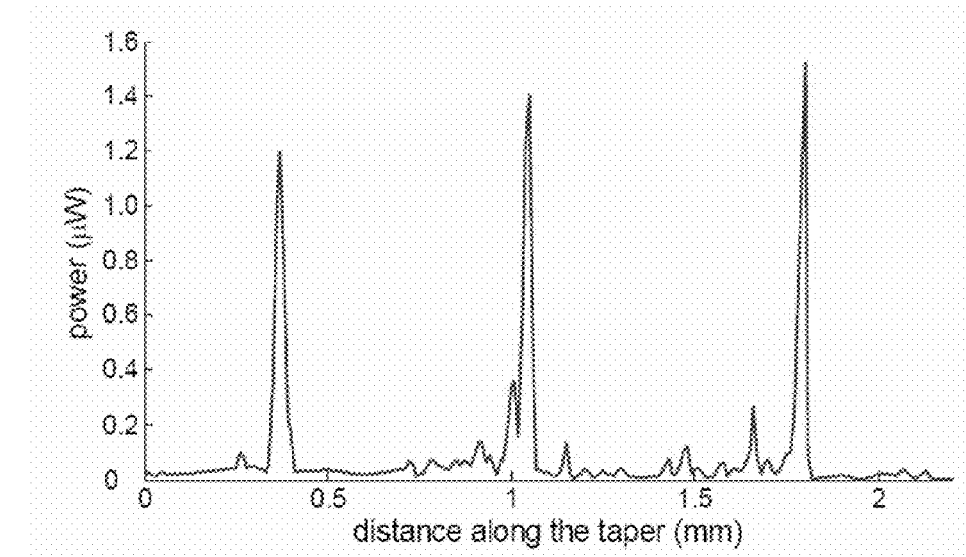
FIG. 11. Plot of power measured at the input facet (large end) of a tapered (80-20 μm) hollow waveguide, versus position of a MMF used to normally illuminate the surface of the taper. The wavelength was fixed to 1600 nm for the case shown.

By reciprocity, the out-coupling of radiation discussed above suggests the possibility of coupling a free space beam (at nearly normal incidence) into a tapered ODR-clad waveguide. In initial experiments, we attached a MMF (50 μm graded index core) to a micropositioner and aligned it overtop a tapered waveguide, approximately normal to the surface. The separation between the cleaved facet of the fiber and the sample surface was ~50 μm, so that the spot size at the waveguide surface was significantly larger than the width of the taper. Light from a tunable laser was launched into the other end of the fiber, and ~5 mW power was delivered to the sample surface. An objective lens was used to collect light from the large cleaved end of the tapered waveguide, and this light was delivered to a photodetector. The power collected from the tapered waveguide was monitored as the MMF was scanned along the length of the taper, and a typical result is shown in FIG. 11. Peaks are evident, corresponding to positions of high input coupling efficiency. By comparing with the experiments described in Section 4, we verified that the in-coupling and out-coupling points are coincident for a given taper and wavelength. Note that the large spot size produced by the MMF results in the simultaneous excitation of numerous sub-modes within a particular vertical mode family. The overall insertion loss exceeds 30 dB, even at the peaks. This is partly due to the semi-opaque Au layer on the top surface of the tapers, as discussed in Section 4. Furthermore, the experiment is expected to be far from optimal from a mode overlap perspective, given the large incident spot size and the complex standing waves formed in the waveguide near mode cutoff.

FIG. 11 illustrates a plot of power measured at the input facet (large end) of a tapered (80-20 μm) hollow waveguide, versus position of a MMF used to normally illuminate the surface of the taper. The wavelength was fixed to 1600 nm for the case shown.

Figure 12A:
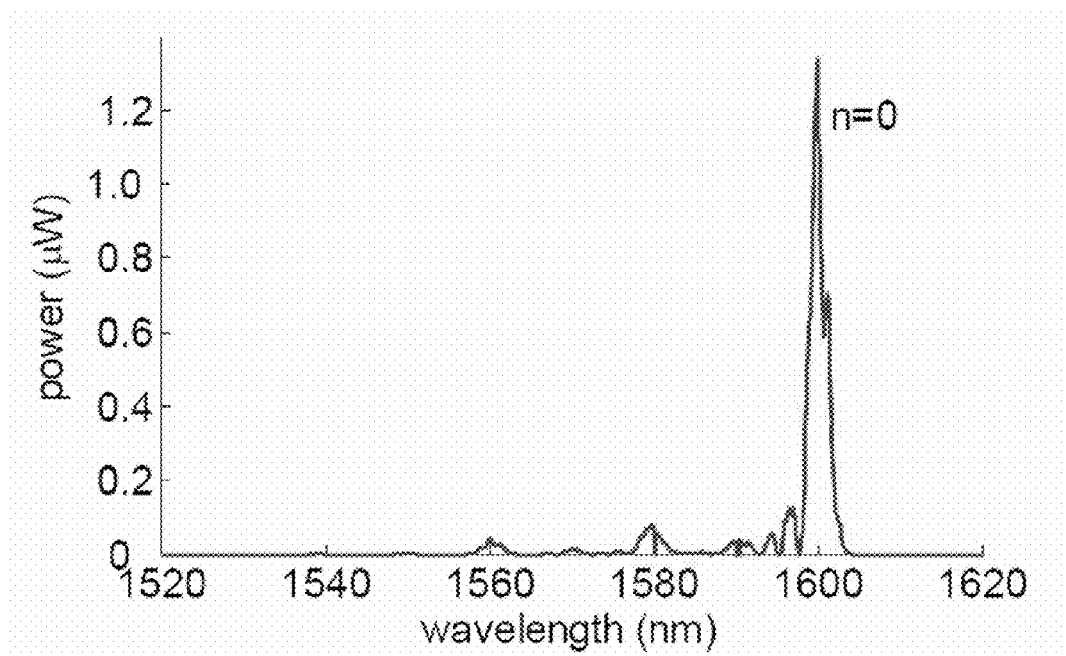
FIGS. 12A-B. Plot of power at the input facet versus wavelength, for normal incidence illumination by a SMF at a fixed position overtop a taper (80-10). The SMF was roughly aligned to the location corresponding to the cutoff of the $TE_{2n}$ modes at 1600 nm wavelength.
Figure 12B:
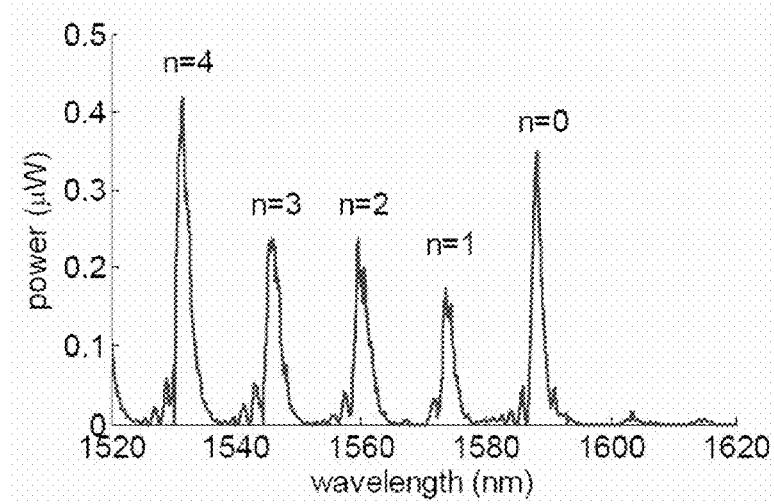

To gain further insight, we replaced the MMF with a SMF and aligned the cleaved end of the SMF approximately 20 µm above the surface of a taper. In this case, the taper is illuminated by a single-lobed, approximately Gaussian beam with diameter ~10-15 µm. FIGS. 12A-12B show results for the case in which the fiber position was fixed, but the wavelength of the input laser was varied. In FIG. 12A, the fiber was approximately centered (with respect to the lateral coordinate y) overtop a particular taper. In this case, a single peak dominates the wavelength scan, which we attribute to the resonant coupling of the $TE_{m0}$ mode at this particular position along the taper.

FIGS. 12A and 12B illustrate plots of power at the input facet versus wavelength, for normal incidence illumination by a SMF at a fixed position overtop a taper (80-10). The SMF was roughly aligned to the location corresponding to the cutoff of the $TE_{2n}$ modes at 1600 nm wavelength. Referring to FIG. 12A, a typical result when the SMF is centered with respect to the taper axis is illustrated. Referring to FIG. 12B, a typical result when the SMF is offset relative to the taper axis is illustrated. Note that the position of the SMF along the taper is also slightly different in the two cases, so that the n=0 peaks are not coincident in wavelength.

Referring to FIG. 12B, the input SMF was intentionally misaligned relative to the central axis of the waveguide. In this case, the wavelength scan reveals a series of peaks with similar height. We attribute each of these to the resonant coupling of a particular horizontal sub-mode, all belonging to the same vertical mode family. This can be understood by considering the images in FIGS. 9A-9D. Within a given $TE_{mn}$ mode family, the cutoff point moves slightly towards the large end of the taper for increasing horizontal mode order n. On the other hand, as the wavelength is decreased the cutoff point of each mode moves towards the small end of the taper. In the experiment described, the input coupling point is fixed and the launch fiber is offset so that its spatial mode overlaps to some degree with many of the guided modes. As the wavelength is varied, each sub-mode becomes resonant for a particular wavelength.

6. Discussion and Conclusions

We have demonstrated an out-of-plane coupling mechanism in tapered, leaky waveguides clad by omnidirectional reflectors. Power radiates in a nearly surface-normal direction as the core thickness approaches the cutoff condition of a guided mode. While the coupling efficiency for the present devices was low (<0.1%), we believe that there is significant scope for improvement through design of the cladding layers and refinement of the taper geometry. Furthermore, the radiation spot size and the spatial dispersion of the coupling can be adjusted by modifying the slope, etc., of the taper.

In some ways, ODR-clad optical waveguides are analogous to metal-clad microwave waveguides [31]. This similarity could make it possible to translate waveguide-based elements from the microwave domain into the optical domain. For example, microwave delay line equalizers based on tapered hollow waveguides were developed almost 50 years ago [29]. With refinement, such as an increase in the mirror reflectance to suppress radiation loss, the tapered waveguides studied here could form the basis of an analogous class of optical filters. Furthermore, we note that tapered ODR-clad waveguides have been proposed as a novel geometry for realization of opto-mechanical coupling and radiation pressure effects [2].

The ability to spatially disperse a spectrally broad signal suggests potential applications in on-chip spectroscopy [23, 30]. In this scenario, a tapered hollow waveguide would be aligned overtop a linear detector array, forming an extremely compact and monolithic spectrometer.

This design would address some traditional drawbacks associated with wedge-filter spectrometers, such as the need for wide area illumination [30]. The omnidirectional band of the cladding mirrors would limit the wavelength range of the spectrometer, but various techniques for broadening the omnidirectional bandwidth have been reported. Furthermore, since a hollow waveguide can be infiltrated with a gas or liquid analyte, such an on-chip spectrometer could be employed as an extremely compact sensing system with applications in chemical and biological detection.

It should be understood that the taper couplers disclosed herein could be fabricated by other means. While the tapered hollow waveguides described herein were fabricated by a self-assembly buckling delamination process, it will be recognized that more conventional approaches could also be used to fabricate these structures. For example, gray scale lithography can be used to fabricate a tapered sacrificial layer. This layer can be deposited with cladding mirrors, and then the tapered sacrificial layer can be removed by an etching process.

The taper couplers could also be useful in the context of 3-dimensional, optical or optofluidic integration. For example, coupling between hollow waveguides on multiple levels of a chip could be achieved using opposing tapers on two different levels, possibly with a focusing optic integrated between them. The tapers could also play the role of wavelength multiplexers in this scenario, enabling multi-channel optical communication on a chip [13]. Finally, they could be used to illuminate or collect light at targeted locations along a microfluidic channel integrated on a separate plane. We hope to explore some of these applications in future work.

Acknowledgements

We thank Ying Tsui, Blair Harwood, and Hue Nguyen for assistance with fabrication processes, and Jim McMullin for useful discussions. The work was supported by the Natural Sciences and Engineering Research Council of Canada and by TRLabs. Devices were fabricated at the Nanofab of the University of Alberta.

Part 2: Out-of-Plane Tapered Waveguide Couplers and Applications

Here we describe a device for coupling light between an air-guided mode of a hollow waveguide and an external beam, where the direction of the external beam is approximately perpendicular to the axis of the hollow waveguide. The hollow waveguide core is clad by periodic, omnidirectional Bragg mirrors, which are in turn terminated by a metallic layer. These hybrid mirrors are designed to almost completely suppress radiation leakage of light propagating in the air core. By tapering the dimensions of the air core, light rays associated with a given mode can be made to assume nearly normal incidence on the cladding mirrors, at wavelength-dependent positions along the taper. Furthermore, by reducing the reflectivity or opacity of the cladding mirrors at such locations, out-of-plane I/O coupling of light is possible. The wavelength dependence of the coupling locations provides a straightforward mechanism for spatially separating a polychromatic light signal. Based on this, we describe application of the taper couplers to wavelength division multiplexed communication systems and on-chip spectroscopic systems.

REFERENCES AND LINKS

1. N. Ponnampalam, R. G. DeCorby, "Out-of-plane coupling at mode cutoff in tapered hollow waveguides with omnidirectional reflector claddings," accepted for publication Jan. 30, 2008, Opt. Express.

2. P. K. Tien, G. Smolinsky, R. J. Martin, "Radiation fields of a tapered film and a novel film-tofiber coupler," IEEE Trans. Microwave Theory and Techniques MTT-23, 79-85 (1975).
3. T. Miura, Y. Yokota, F. Koyama, "Proposal of tunable demultiplexer based on tapered hollow waveguides with highly reflective multilayer mirrors," Proc. of LEOS 2005, 272-273 (2005).
4. N. Ponnampalam, R. G. DeCorby, "Analysis and fabrication of hybrid metal-dielectric omnidirectional Bragg reflectors," Appl. Opt. 47, 30-37 (2008).
5. N. Ponnampalam, R. G. DeCorby, "Self-assembled hollow waveguides with hybrid metaldielectric Bragg claddings," Opt. Express 15, 12595-12604 (2007).
6. C. P. Bacon, Y. Mattley, R. Defrece, "Miniature spectroscopic instrumentation: applications to biology and chemistry," Rev. Scientific Inst. 75, 1-16 (2004).
7. R. F. Wolfenbuttel, "State-of-the-art in integrated optical microspectrometers," IEEE Trans. Instrum. Meas. 53, 197-202 (2004).
8. J. T. Daly, E. A. Johnson, A. Bodkin, W. A. Stevenson, D. A. White, "Recent advances in miniaturization of infrared spectrometers," Proceedings of SPIE 3953, 70-87 (2000).
9. M. L. Adams, M. Enzelberger, S. Quake, A. Scherer, "Microfluidic integration on detector arrays for absorption and fluorescence micro-spectrometers," Sensors and Actuators A 104, 25-31 (2003).
10. M. Florjanczyk, P. Cheben, S. Janz, A. Scott, B. Solheim, D.-X. Xu, "Multiaperture planar waveguide spectrometer formed by arrayed Mach-Zehnder interferometers," Opt. Express 15, 18176-18189 (2007).
11. G. R. Fowles, Introduction to Modern Optics, Second Ed., Dover Publications, Inc., New York (1975).
12. S.-W. Wang et al., "Concept of a high-resolution miniature spectrometer using an integrated filter array," Opt. Lett. 32, 632-634 (2007).
13. O. Schmidt, P. Kiesel, M. Bassler, "Concept of chip-size wavelength detectors," Opt. Express 15, 9701-9706 (2007).
14. R. Z. Morawski, "Spectrophotometric applications of digital signal processing," Meas. Sci. Technol. 17, R117-R144 (2006).
15. J. W. Goodman, F. J. Leonberger, S.-Y. Kung, R. A. Athale, "Optical interconnections for VLSI systems," Proc. of IEEE 72, 850-866 (1984).
16. A. V. Mule, E. N. Glytsis, T. K. Gaylord, J. D. Meindl, "Electrical and optical clock distribution networks for gigascale microprocessors," IEEE Trans. VLSI Systems 10, 582-594 (2002).
17. M. J. Kobrinsky et al., "On-chip optical interconnects," Intel Tech. Journal 8, 129-141 (2004).
18. Y. Yi, S. Akiyama, P. Bermel, X. Duan, L. C. Kimerling, "Sharp bending of on-chip silicon Bragg cladding waveguide with light guiding in low index core materials," IEEE J. Sel. Top. Quantum Electron. 12, 1345-1348 (2006).
19. Y. Sakurai, F. Koyama, "Control of group delay and chromatic dispersion in tunable hollow waveguide with highly reflective mirrors," Jap. J. Appl. Phys. 43, 5828-5831 (2004).
20. T. F. Krauss, "Slow light in photonic crystal waveguides," J. Phys. D., Appl. Phys. 40, 2666-2670 (2007).
21. F. Lederer, U. Trutschel, C. Waechter, "Prismless excitation of guided waves," J. Opt. Soc. Am. A 8, 1536-1540 (1991).
22. B. Pezeshki, F. F. Tong, J. A. Kash, D. W. Kisker, "Vertical cavity devices as wavelength selective waveguides," J. Lightwave Technol. 12, 1791-1801 (1994).

1. Introduction and Prior Art

We recently reported [1] a method for surface-normal coupling of light into and out of a hollow optical waveguide, where the hollow waveguide is clad by omnidirectional reflector claddings. In such a waveguide, there is no critical angle for mode guidance. Thus, at mode cutoff the rays associated with a guided mode are normally incident on the cladding mirrors and the mode becomes an optical standing wave. Similar behavior is well known from early studies of microwave waveguides with metallic boundaries. If one or more of the cladding mirrors are partially transmitting at the cutoff point, efficient light coupling between a guided mode and a waveguide-normal external beam is possible. In the present report, we describe several useful devices based on this concept.

In conventional total internal reflection waveguides, input/output couplers based on mode cutoff in a taper were proposed and demonstrated in the 1970s [2]. However, these couplers were not widely used for at least two reasons. First, the fabrication of planar waveguides with vertically tapered core thickness is not trivial. Second, it is necessary to orient the free-space beam along a nearly in-plane direction (i.e. parallel to the substrate), since mode cutoff occurs at the critical angle for total internal reflection between the core and one of the cladding materials. More recently, surface-normal coupling in symmetric hollow-core waveguides with Bragg reflector claddings was proposed but not experimentally demonstrated [3]. The latter proposal is similar to the invention described here, but has several practical drawbacks. First, the used of all-dielectric cladding mirrors implies the need for a large number of periods in order to suppress unintentional leakage from the core (prior to the desired coupling point). This would make fabrication challenging. Second, there is an inherent design tradeoff in choosing the cladding reflectance: higher reflectance suppresses unwanted leakage from the core but results in a tighter design tolerance for the coupling point. In other words, the exact position of the coupling point along the taper becomes increasingly sensitive to the taper geometry as the mirror reflectance is increased. Finally, while unidirectional coupling is most often desirable, the symmetry of the couplers described in [3] implies that light radiates both upwards and downwards at the mode cutoff point.

In the following we describe an improved coupling approach that addresses each of these drawbacks. The coupling scheme is based on tapered waveguides clad by hybrid metal-dielectric mirrors exhibiting one or more omnidirectional reflection bands. The use of hybrid mirrors enables greater control over the coupling positions and improved manufacturability. We also describe several novel applications that are enabled by such couplers.

Figure 13:
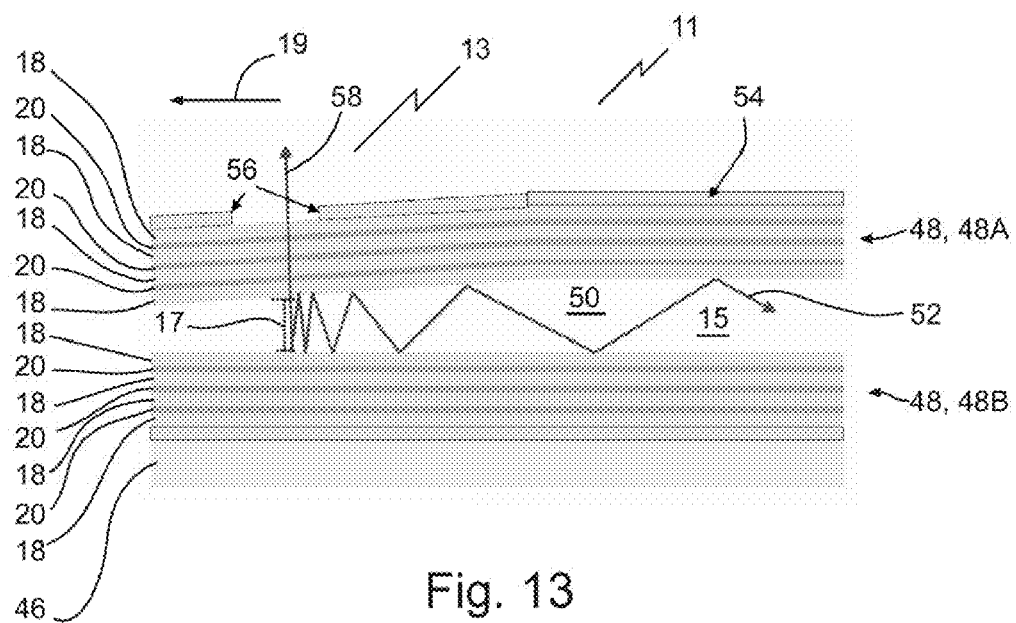
FIG. 13. A scheme for nearly surface-normal input/output coupling to a waveguide clad by hybrid metal-dielectric omnidirectional mirrors is shown. The waveguide core thickness is tapered so that rays associated with a guided mode approach normal incidence on the cladding mirrors at some desired location. At the same location, the outer metallic layer of one mirror is removed, thereby reducing the reflectance and opacity of the mirror at that location. A surface-normal external beam can be efficiently coupled to the guided mode in this way.

2. Out-of-Plane Couplers Based on Tapered Waveguides with Hybrid Metal-Dielectric Claddings The proposed coupling scheme is illustrated schematically in FIG. 13. Referring to FIG. 13, a tapered waveguide 11 is illustrated, comprising a multilayer stack 13 of light guiding layers (for example, layers 18, 20, 48). The multilayer stack 13 defines a channel 15 between at least a first waveguiding layer 48A and a second waveguiding layer 48B. The light guiding layers may form omni-directional reflectors, for example to provide omnidirectional reflection for at least one state of light polarization within a specified wavelength band. The channel 15 may be a low refractive index core (i.e. air or other low index medium), and is clad by omnidirectional dielectric reflectors (ODRs), which may be in turn terminated by a metal layer. The metal termination increases the omnidirectional bandwidth and reflectance of a few period ODR [4], thereby simplifying fabrication but also enabling low loss guidance of light along a low index channel [5]. The outer metal layers can be made much thicker than the skin depth of the guided light, in order to suppress any unwanted leakage of light from the waveguide core.

When the core of such a waveguide is tapered downwards, for example by the channel 15 having a diminishing thickness (for example thickness 17) in a first direction 19, the rays associated with guided light approach normal incidence on the cladding mirrors. By tapering the height of the channel, light of differing wavelengths can be separated. At the cutoff thickness, the rays are directed nearly normal to the plane of the substrate. Surface-normal coupling to an external beam at these cutoff positions is made possible by the patterned removal of the outer metal termination layer of one or both cladding mirrors. Furthermore, since TE and TM modes are degenerate at the cutoff point, this coupling mechanism has the highly desirable potential to be polarization-independent.

FIG. 13 illustrates a scheme for nearly surface-normal input/output coupling to a waveguide clad by hybrid metal-dielectric omnidirectional mirrors. At least one of the first waveguiding layer 48A and the second waveguiding layer 48B has a region of increased transmissivity (for example defined by window 56 in layer 54) adjacent a selected thickness (for example thickness 17) of the core. The region may be defined by a reduced number of stacked waveguiding layers, as shown in FIG. 13. The region may be a region of at least one of reduced reflectivity, and reduced opacity. The multilayer stack may also comprise an optical path (defined by for example layers 48A and aperture 56) normal to the waveguide at a position along the waveguide length corresponding to a selected thickness of the waveguide. The optical path may be at least partially transparent to light of a desired wavelength. Thus, the optical path may allow for at least partial transmission of a desired wavelength (for example ray 52) from the waveguide. The selected thickness may correspond to a mode cutoff of a desired wavelength (for example from ray 52), as shown. Referring to FIG. 13, the substrate, ODR, core, guided ray, opaque material, aperture, and in/out coupled ray are indicated by the reference numerals 46, 48, 50, 52, 54, 56, and 58, respectively. The waveguide core thickness is tapered so that rays associated with a guided mode approach normal incidence on the cladding mirrors at some desired location. At the same location, the outer metallic layer of one mirror is removed, thereby reducing the reflectance and opacity of the mirror at that location. A surface-normal external beam can be efficiently coupled to the guided mode in this way.

Compared to the prior art, the proposed coupling scheme provides several key advantages:

a. The outer metallic layers suppress the leakage of stray light.

b. The coupling points can be defined using standard lithographic patterning of the metallic layers. Furthermore, radiation is restricted to the position and direction defined by the apertures, windows, or openings in the reflective layer, for example the metallic films. For example, coupling along one desired direction can be realized.

c. Compared to an all-dielectric design, the use of hybrid metal-dielectric reflectors relaxes the fabrication tolerance of taper couplers. This is because the removal of the outer metal layer can significantly reduce the overall reflectance of the cladding mirror with appropriate design, so that light will be efficiently coupled at locations defined by the apertures in the metallic layers.

d. As shown schematically in FIG. 14, the outer metallic layers can act as built-in electrodes for electrostatic tuning of the mirror separation in the tapered waveguide. Since the coupling point for a given wavelength is sensitive to the mirror separation, this provides a mechanism for electrical tuning of the output coupling point. This simplifies the fabrication of such tapers, by relaxing the required dimensional accuracy. It can also enable dynamic switching of wavelength channels. In some embodiments, the light-guiding layers comprise at least one of one-dimensional, two-dimensional, and three-dimensional photonic crystals.

The aperture in the metal layer can be designed to modify the spatial properties of the input and output beams. For example, rather than a single opening in the metal layer, the aperture can be patterned as a diffractive optic in order to improve the beam coupling efficiency. The layer 54 in FIG. 13 may be a reflective metal layer applied to at least one of below, within, and above the multilayer stack 13.

Figure 14:
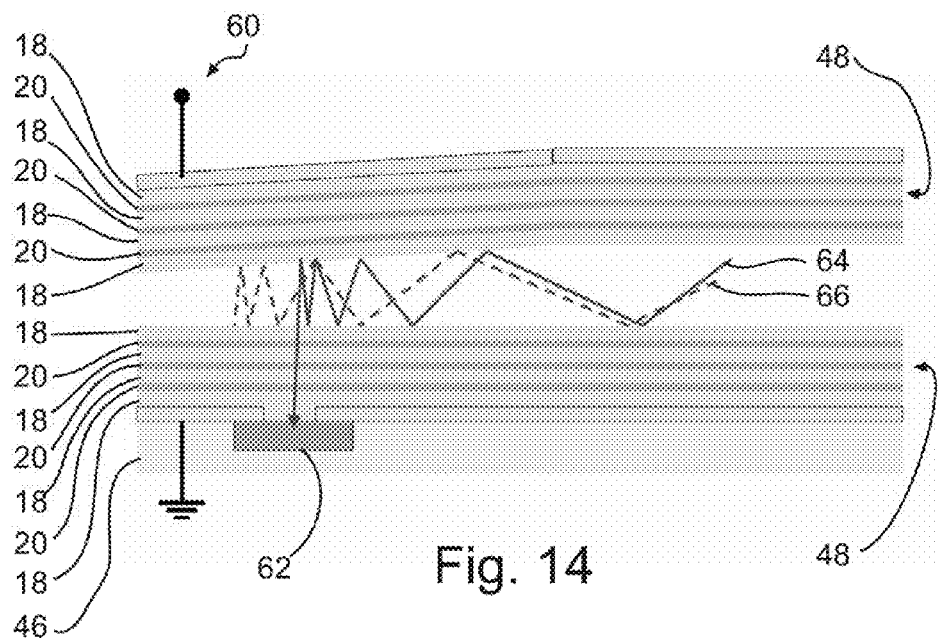
FIG. 14. A voltage applied to the upper and lower metallic layers can be used to electrostatically tune the core thickness (mirror separation), thereby tuning the position of the outcoupling point.

FIG. 14 illustrates a voltage applied to the upper and lower metallic layers can be used to electrostatically tune the core thickness (mirror separation), thereby tuning the position of the out-coupling point. The tuning voltage, photodetector, tuned ray, and un-tuned ray are indicated by the reference numerals 60, 62, 64, and 66, respectively.

3. Microspectrometers Based on Tapered Hollow Waveguide Couplers

Compact, highly integrated spectrometer instruments are expected to find extensive applications in various fields, including microfluidics, lab-on-a-chip (LOC), chemical and biological sensing, and genomics [6,7]. Chip-scale spectrometers reported to date offer resolving powers on the order of 10-100, but there is a need for such devices to provide resolving power on the order of 1000 or greater [7]. Most spectrometers are based either on diffraction gratings or on optical interferometers. Some require moving parts in order to capture a spectrum, but for many applications a spectrometer without moving parts is highly preferable.

Diffraction grating spectrometers provide spatial dispersion of a polychromatic signal without need for moving parts, and are by far the most common type of commercial spectrometer. Miniaturized (micro-optic) spectrometers comprising a fiber optic input, diffraction gratings, reflecting and focusing optics, and a CCD imaging array in a single package are now widely available from several manufacturers [8]. However, the resolution of a diffraction grating instrument is directly related to its size (i.e. to the distance between the grating and the detector), which presents a barrier to the further downsizing of such devices [7,9,10]. The need for physical separation and focusing optics between the dispersing element and the detector is a distinct drawback of grating-based spectrometers.

Interferometer-based spectrometers offer several advantages, including superior light throughput [10] and greater potential for high resolution combined with small size [11]. Various types of interferometers can be employed for spectroscopy, including the Michelson and Mach-Zhender arrangements. For small-scale, integrated systems, the Fabry-Perot interferometer is an attractive alternative, due to its simplicity and potential for high resolution. One drawback of the conventional Fabry-Perot spectrometer is that it selects only one spectral component from the incident beam. To obtain a spectrum, it is necessary to either tune the cavity resonance (ie. the index or length of the cavity) [7] or to broadly illuminate an array of Fabry-Perot spectrometers [12]. Wedge filter (linear variable filter) spectrometers [13] are a particularly successful implementation from the latter category. However, the need for broad-area, uniform illumination of the spectrometer is often a distinct disadvantage of wedge-filter devices, especially with respect to integrated systems [13]. Furthermore, Fabry-Perot filters are sensitive to the incident angle of light, so that the input beam must also be highly collimated. Another drawback of the wedge filter spectrometer is a low optical throughput, since only a fraction of the incident light (i.e. the resonant wavelength) reaches the underlying photodetector at a given location [7]. Finally, there are tradeoffs between the wedge angle, the resolution, and the manufacturability of such filters, which typically limits their spatial dispersion to less than 10 nm/mm [12]. For example, a wedge filter spectrometer operating over a 200 nm bandwidth typically needs to be greater than 2 cm in length.

Figure 15:
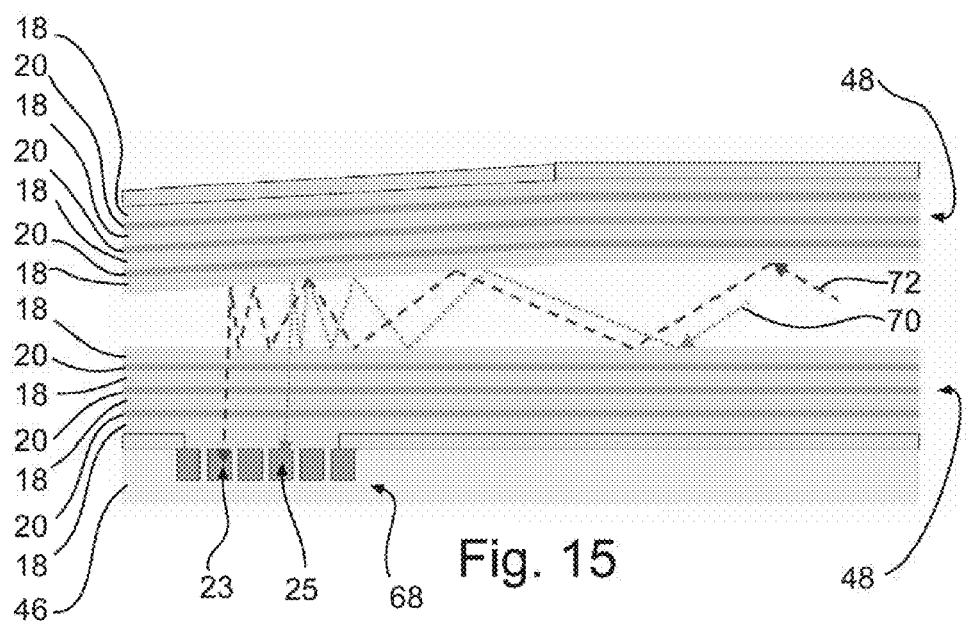
FIG. 15. The schematic diagram shows the implementation of a novel integrated spectrometer. An ODR-clad waveguide is tapered such that a propagating waveguide mode is subject to a cutoff condition at a wavelength-dependent position along the taper length. By placing the taper overtop a detector array, the spectrum of the polychromatic input light is measured.

We describe a spectrometer based on a tapered ODR-clad waveguide coupler, which can provide the traditional advantages of a Fabry-Perot spectrometer (high resolution and high throughput) while addressing both the input beam and size limitations of a conventional wedge spectrometer. The new device described is essentially a waveguide-coupled wedge spectrometer, as shown in FIG. 15. A polychromatic light beam is input to the wide end of the tapered, ODR-clad waveguide. As described in Section 2, the light propagates towards the small end of the taper until it reaches its cutoff point, where it is radiated in a nearly surface-normal direction from the waveguide. The cutoff position is wavelength-dependent, so that each spectral component of the polychromatic input signal is radiated at a unique position along the taper. Thus, the taper spatially disperses the spectral components of the input signal, analogous to the function provided by a diffraction grating. Referring to FIGS. 14 and 15, a photodetector 62 or photodetector array 68 may be positioned to detect light passing from the channel through the region. Specifically, the longer wavelength components of the signal are radiated nearer the large end of the taper. By aligning the taper overtop a photodetector array, such as a CCD array or similar, the spectral content of the signal is captured without need for moving parts or tuning of the interferometer.

FIG. 15 illustrates the schematic diagram shows the implementation of a novel integrated spectrometer. An ODR-clad waveguide is tapered such that a propagating waveguide mode is subject to a cutoff condition at a wavelength-dependent position along the taper length. By placing the taper overtop a detector array, the spectrum of the polychromatic input light is measured. The photodector array, $\lambda_M$ and $\lambda_N$ are indicated by reference numerals 68, 70, and 72, respectively. As shown in FIG. 15, there may be at least two regions (indicated at positions 23, 25) of increased transmissivity spaced along the channel in the first direction.

Compared to the conventional approaches, the taper spectrometer offers several key advantages:

a. The taper spectrometer provides a waveguide-coupled input, for efficient interface to an external input beam or fiber optic. Unlike the conventional wedge spectrometer, there is no need for broad area illumination by a collimated beam.

b. The taper acts to spatially disperse the spectral components of the input signal prior to detection. Thus, the taper spectrometer can have much higher throughput than the conventional wedge spectrometer.

c. The taper spectrometer simultaneously disperses a guided wave input and couples the spectral components in an out-of-plane direction. This simplifies the monolithic integration of the optical devices with a chip-based photodetector array such as a CCD. By contrast, many integrated optic spectrometers (such as arrayed waveguide grating devices) disperse the spectral components of a signal within the plane of the substrate surface. In that case, the photodetector array is typically mounted at the edge of the grating chip, and aligned perpendicular to the grating chip. The latter geometry typically requires a hybrid packaging approach, and is not amenable to monolithic integration.

d. The taper slope can be much steeper than in a conventional wedge filter, so that the spatial dispersion can be orders of magnitude higher. This enables the taper spectrometer to have a very small device size for a given optical bandwidth, within limits set by the pixel size of available photodetector arrays.

It is well known [14] that the performance (including the resolving power and sensitivity) of filter-based spectrometers can be enhanced using digital signal processing techniques and various fitting algorithms. In the spectrometer implementation described, it is feasible for the digital electronics to be integrated on the same chip as the photodetector array and the taper coupler.

4. Multi-Level on-Chip Optical Interconnection Using Air-Core Waveguides

The power dissipation and limited bandwidth of electrical interconnects present a major barrier to the continued advancement of computing systems [15]. One possible solution is to replace the longest electrical lines (such as core to memory data buses and clock distribution circuits) by on-chip optical interconnects [15-17]. For optical interconnects to compete with electrical interconnects at the chip level, they must provide lower signal delay and/or higher data throughput [16,17]. Recent studies [17] suggest that for optical interconnects to provide a clear advantage, wavelength division multiplexing (WDM) must be exploited. WDM can massively increase the bandwidth density and throughput of an optical bus, and might even allow a reduction in the number of interconnect levels on a CMOS chip.

To date, on-chip WDM has been studied mostly in the context of optical ring and disk resonators. We describe a new approach (see FIG. 16) based on the wavelength-selective coupling of light to/from a tapered air-core waveguide cladded by omnidirectional dielectric reflectors (ODRs). The operation of these couplers was described in Sections 2 and 3.

Figure 16:
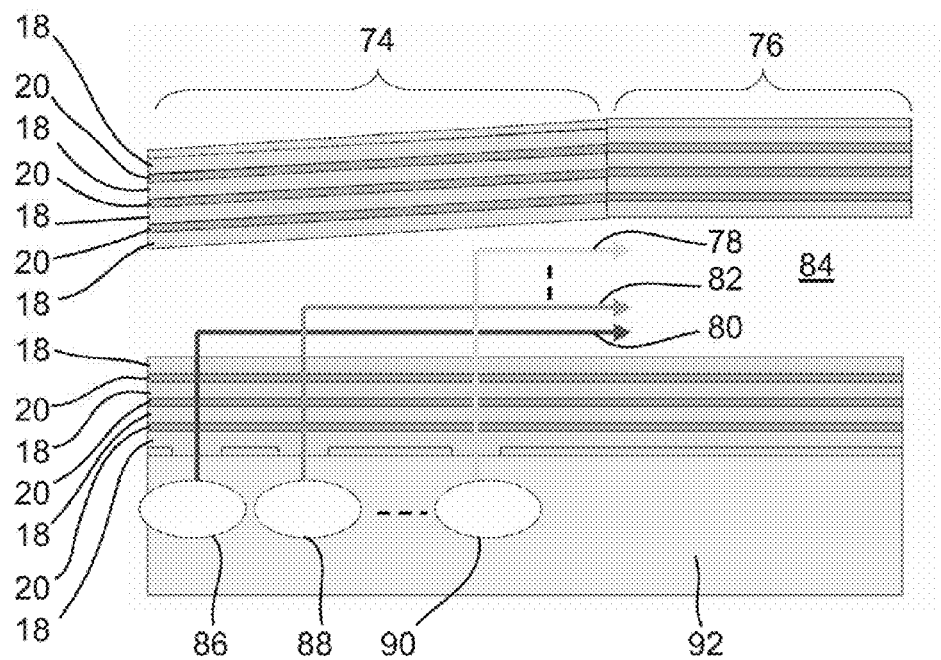
FIG. 16 is a proposed scheme for coupling multiple wavelength sources to an air-core waveguide. In the reverse direction, light could be coupled from the guide to an array of photo detectors.

FIG. 16 illustrates a proposed scheme for coupling multiple wavelength sources to an air-core waveguide. In the reverse direction, light could be coupled from the guide to an array of photodetectors. The tapered Bragg waveguide, Bragg waveguide, $\lambda_N$, $\lambda_1$, $\lambda_2$, and air core are indicated by reference numerals 74, 76, 78, 80, 82, and 84, respectively. The $\lambda_1$ source, $\lambda_2$ source, $\lambda_N$ source, and the optoelectronic substrate are indicated by reference numerals 86, 88, 90, and 92, respectively.

Figure 17:
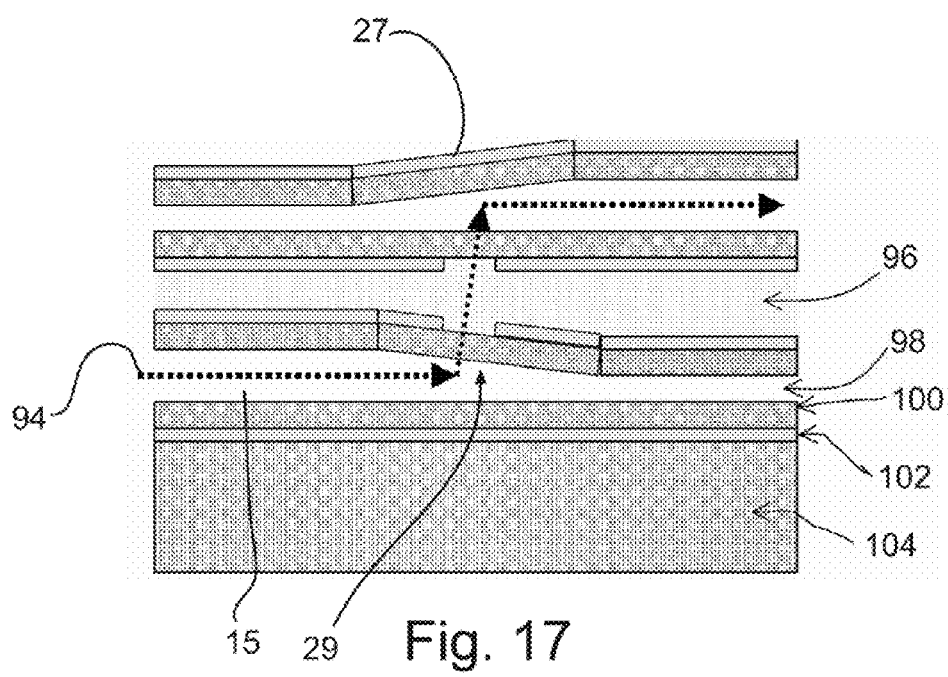
FIG. 17. Schematic showing the wavelength-selective coupling of light between tapered waveguides on two different levels of an integrated optical chip.

As an on-chip interconnect technology, the approach described has the following merits:

a. It inherently combines WDM with a technique for out-of-plane coupling to and from the air core waveguide. The latter function has been cited as a key challenge for on-chip optical interconnects [16]. Out-of-plane couplers can accommodate the use of vertically emitting lasers, etc., and could be the basis for coupling between optical waveguides on multiple levels of an interconnect stack (3D optical integration, as shown in FIG. 17).

b. Low signal delay is afforded by guiding of light along low refractive index channels [15,17]. In conventional on-chip waveguides (based on total internal reflection), this is at odds with the need for high confinement and sharp bending of light. In ODR-cladded waveguides, however, light can be guided (in a low index core) around tight bends, even in the case of multimode propagation [18]. Thus, ODR-cladded air waveguides offer unique potential to combine low delay, low propagation loss, and low bend loss.

c. Air-core waveguides are relatively temperature-insensitive [19], which could be a major benefit in the context of WDM devices sitting atop an operational CMOS chip.

d. Hollow Bragg cladding waveguides provide unique options for optical signal processing, such as optomechanical tuning and novel options for engineering waveguide dispersion and group delay [19].

Referring to FIG. 17, a second waveguide 27 may be optically coupled to the channel 15 through the region of increased transmissivity 29. is a schematic illustrating the wavelength-selective coupling of light between tapered waveguides on two different levels of an integrated optical chip. The light ($\lambda_N$), transparent dielectric, air core, dielectric mirror, opaque metal, and electronics substrate are indicated by the reference numerals 94, 96, 98, 100, 102, and 104, respectively.

There are obvious extensions of these ideas, such as the coupling of light between a hollow waveguide on one level and a microfluidic sample on another level of the same chip. Complex wavelength multiplexing functions are also envisioned, such as adding/dropping specific wavelength channels at selected locations on a chip.

5. On-Chip Absorption and Fluorescence Spectroscopy Employing Tapered Hollow Waveguide Couplers Many of the most compelling applications for micro-spectrometers lie in the realm of microfluidics, lab-on-a-chip (LOC), and/or micro-total-analysis (mTAS) systems. The spectrometer described in Section 3, in a preferred embodiment, is based on a hollow core optical waveguide clad by omnidirectional reflectors. The core of such waveguides can be infiltrated by a gas or liquid analyte, making it possible to implement extremely compact sensing systems that employ absorption or fluorescence spectroscopy.

The basic idea is illustrated in FIG. 18, using the example of fluorescence spectroscopy. An analyte is introduced into the core of a hollow waveguide, and guided light is made to pass through the analyte. The fluorescence of the analyte at a known wavelength can then be assessed in situ using the dispersion and out-of-plane coupling provided by a tapered waveguide section. In fluorescence spectroscopy on microfluidic chips, a general challenge is the separation of the emitted light from the (typically much higher power) excitation light. Using the waveguide taper couplers, such separation can be achieved by placing a photodetector underneath (or overtop) the outcoupling point associated with light at the emission wavelength. The excitation light is then isolated from the photodetector by the opaque metal layer, improving the signal to noise ratio of the measurement. Some of the excitation light will be reflected back along the taper (see FIG. 19), thereby passing through the analyte a second time and further improving the measurement sensitivity.

FIG. 18 illustrates the basic concept of performing on-chip spectroscopy of an analyte embedded inside the core of a hollow waveguide. The excitation light can be separated from the emission light by using the wavelength-selective outcoupling property of a tapered waveguide section. The $\lambda_{EM}$, analyte, and $\lambda_{EXC}$ are indicated by the reference numerals 106, 108, and 110, respectively.

FIG. 19 illustrates a top view schematic of the device illustrated in FIG. 18. The out-coupling of fluorescent light, back-reflected excitation light, and hollow waveguide are indicated by the reference numerals 112, 114, and 116, respectively.

Figure 20:
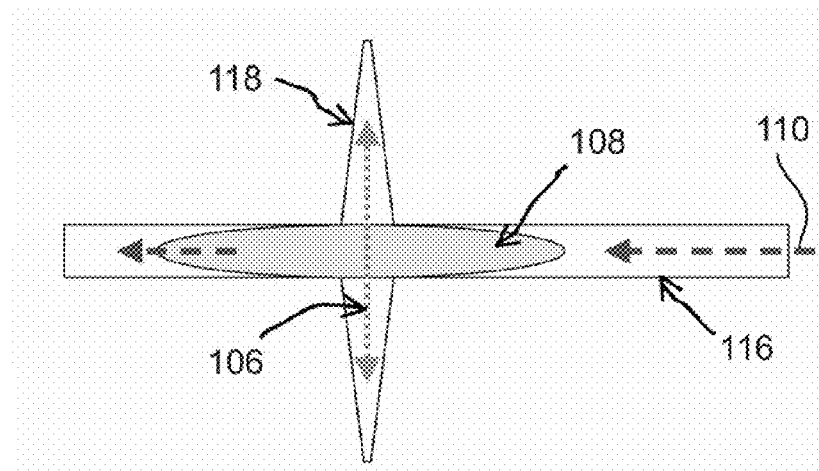
FIG. 20. Top view schematic of the device illustrated in FIG. 18.
Figure 21:
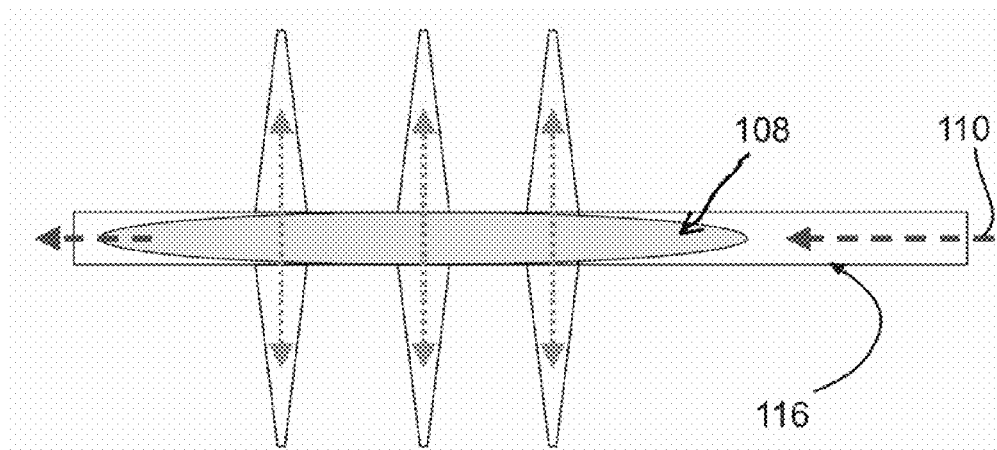
FIG. 21. Top view schematic showing a series of taper spectrometers intersecting an analyte-containing hollow waveguide. Emitted or scattered light is thereby spectrally resolved at various locations around the chip.

The tapered waveguide disclosed herein may be used as at least one of a spectrometer, wavelength shift sensor, on-chip optical network, absorption analyzer, fluorescence analyzer, and wavelength division multiplexor. Given the discussion above, the tapered waveguide section may also be used to obtain the spectrum of absorbed or fluoresced light from a sample. Possible geometries for integrating one or more spectrometers along with an analyte-containing channel are shown in FIGS. 20 and 21. It should be noted that we have already demonstrated the ability to form crossing channels of the type indicated.

FIG. 20 illustrates a top view schematic of two tapered spectrometers intersecting an analyte-containing hollow waveguide channel. The light emitted or scattered by the analyte is spectrally resolved by the adjacent spectrometers. The taper coupler/spectrometer is indicated by reference numeral 118.

FIG. 21 illustrates a top view schematic showing a series of taper spectrometers intersecting an analyte-containing hollow waveguide. Emitted or scattered light is thereby spectrally resolved at various locations around the chip.

Description Part 3

Figure 22:
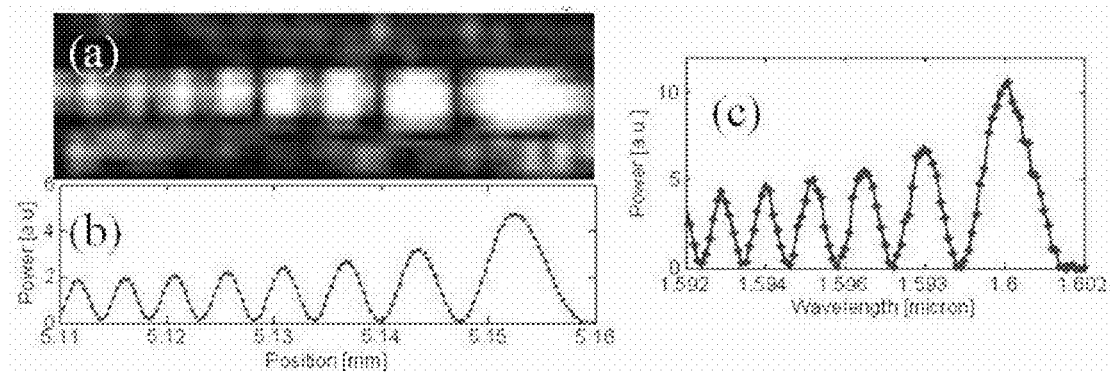
FIGS. 22A-C.

In addition to exhibiting diverging loss as it approaches the cutoff point, a mode also exhibits back-reflection into the reverse propagating mode. As described above, the back-reflection results in a standing-wave radiation pattern leading up to the final cutoff position. In other words, significant radiation is emitted at a series of points leading up to cutoff as shown for example in FIGS. 22($a$) and ($b$). This spatial spreading of the radiation near cutoff is detrimental to the straightforward application of the tapers in spectroscopy and wavelength multiplexing. As shown in FIG. 22($c$), a photodetector pixel placed at a fixed point overtop the taper will receive peak power for a light wavelength corresponding to cutoff at that position. However, the same detector will also exhibit significant response to light at a series of peaks on the short wavelength side of the main peak. This is due to the standing wave effects described.

Referring to FIG. 22($a$), a magnified image of a typical standing-wave radiation pattern leading up to the final mode cutoff position is illustrated. The brightest spot at the right of the image is the cutoff point. Referring to FIG. 22($b$), simulation results showing the radiated power at a fixed wavelength versus position along the taper are illustrated. Referring to FIG. 22($c$), a simulated result is illustrated showing the wavelength dependence of power radiated at a fixed position overtop the tapered waveguide. The dominant peak is at 1600 nm wavelength, corresponding to the cutoff wavelength at this position. The satellite peaks at shorter wavelength arise from light wavelengths experience cutoff at points further along the taper.

These detrimental standing wave effects can be reduced by for example increasing the reflectance of the waveguide cladding mirrors, since higher cladding reflectance results in a steeper radiation gradient leading up to the cutoff point, thereby reducing the amplitude of the satellite peaks relative to the main peak. In practice, it is often challenging to increase mirror reflectance to an arbitrarily high value. Thus, we describe alternative methods to mitigate the standing wave effects and thereby improve the resolution of the proposed spectrometer or wavelength multiplexor.

Selective Transmission of Near-Normal Light Rays

Figure 23:
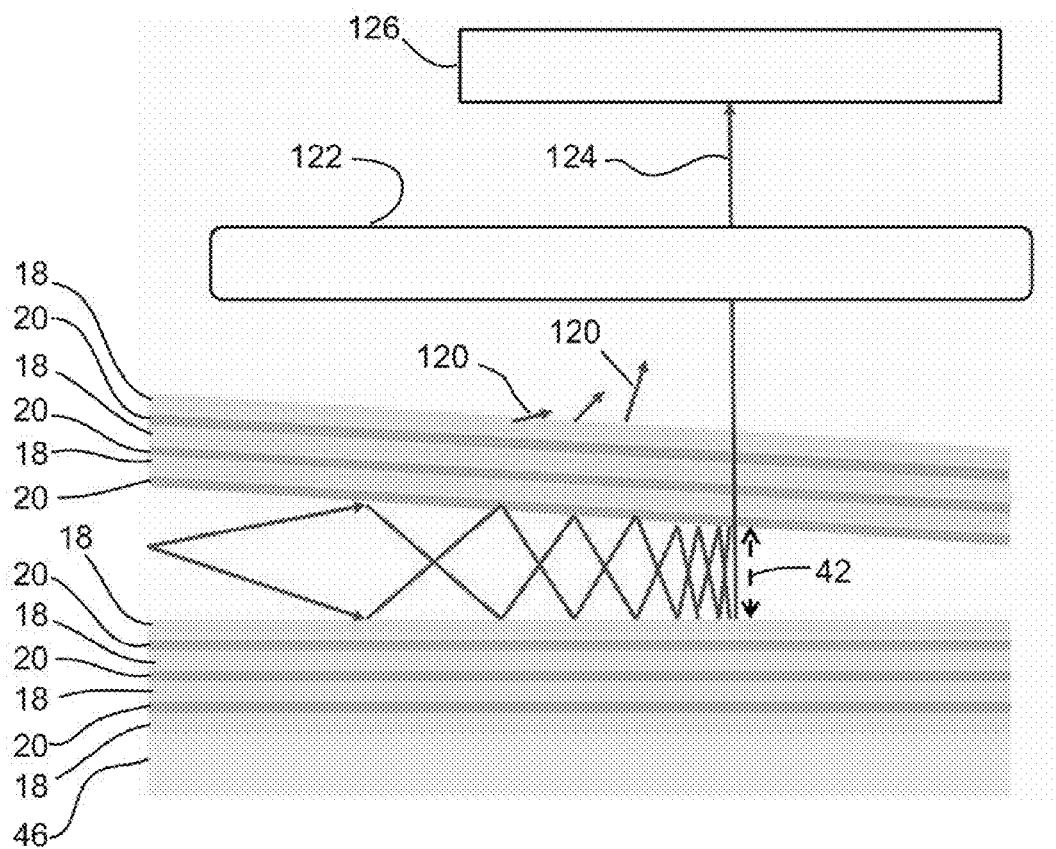
FIG. 23. Schematic illustration of a method to improve the wavelength resolution of the tapered waveguide out-coupler. Near-normal rays associated with the final cutoff position of a mode are selectively transmitted to a photodetector by placing an angular dependent filter or low numerical aperture optical device in the path.

As shown in FIG. 23 and described in detail above, as a mode approaches cutoff (cutoff thickness illustrated by reference numeral 42), light is radiated at angles increasingly normal to the tapered waveguide axis. For high resolution spectroscopy and wavelength multiplexing, it is desirable to accept only those light rays associated with the final outcoupling spot described above corresponding to the cutoff thickness 42, and which are the rays emanating at angles nearest to the normal. As shown in FIG. 23, this can be accomplished by placing for example at least one of an angular-dependent transmission filter (illustrated by reference numeral 122) and a low numerical aperture optical element (not shown) between the tapered waveguide and the detection unit 126, for example a photodetector or photodetector array.

Referring to FIG. 23, a schematic illustration is shown of a method to improve the wavelength resolution of the tapered waveguide out-coupler. Normal and near-normal rays 124 associated with the final cutoff position of a mode are selectively transmitted to a photodetector 126 by placing an angular dependent filter 122 or low numerical aperture optical device in the path. Near-normal rays may be for example within 5, 10 degrees from the normal to the waveguide axis. Off-normal rays 120 are rejected.

Various well-known optical filters exhibit the desired angular dependence within a specified wavelength range. For example, a Fabry-Perot cavity can be designed to be highly transmitting for normal incidence light in a given wavelength band while being highly reflective for obliquely incident light in the same wavelength band. Furthermore, the bandwidth of such a filter can be controlled by well known design principles. Diffraction gratings and metal hole arrays may be designed to preferentially transmit normally incident light, and could for example be incorporated in the outer metal layers of the waveguides described above, for example replacing the simple aperture/window in that case. The grating or hole array may be designed to exhibit a position-dependent wavelength response along the taper length, using straightforward lithographical patterning techniques.

Another approach mentioned above is the use of low numerical aperture optics between the tapered waveguide and the photodetector array. Options for low numerical aperture optics include for example optical baffles, graded index lens (GRIN lens) arrays, fiber optic bundles and fiber optic plates (FDPs).

Application of a Stationary Transform Function Calibration Process

The tapered waveguide may also be used as a stationary transform spectrometer. For each frequency component of light input to the tapered waveguide, there is not only a unique cutoff position, but also a unique standing wave radiation pattern leading up to the cutoff point. This standing wave pattern can be viewed as a spectral signature. Furthermore, since the group velocity of light in the tapered waveguide is greatly reduced in the section leading up to the cutoff point, the standing wave pattern has a spatial period much greater than the free-space wavelength of the input light. This is advantageous compared to some other standing-wave transform spectrometers that have been described in the literature. The large standing wave period produced by slow light enables the sampling of the interferogram by commercially available photodetector arrays with pixel size on the order of for example 0.001 mm or greater. As shown schematically for the case of a dual-frequency (dual wavelength) input in FIG. 24, a photodetector array 128 may be used to capture the stationary (standing wave) interferogram 130 produced by polychromatic light along the length of the taper. This concept extends in a straightforward way to the case of an arbitrary polychromatic input signal.

Referring to FIG. 24, the schematic shown illustrates the extraction of an accurate spectrum from the standing-wave interferogram in a tapered waveguide subject to mode cutoff. The inteferogram 130 is collected by a photodetector array 128 and delivered as raw data to a digital signal processor (DSP) 132 or other computing engine. The DSP uses calibration data and an inverse transform algorithm to extract the corrected spectrum from the raw data. The polychromatic light, comprising $\lambda_1$ and $\lambda_2$, is illustrated by reference numerals 134 and 136, respectively.

The response of the tapered waveguide combined with the response of the photodetector array can be characterized at a series of known wavelengths within the intended band of operation. This response can be stored as a data array and then subsequently used in an inverse transform operation to extract the spectral content of an unknown input. Various algorithms based on such an inverse transform operation have been described in the scientific and patent literature, and it has been shown that in some cases the effective resolution of such a spectrometer can be greatly enhanced relative to the optical resolution of the grating or filter employed. Similar calibration can also be used to enhance the signal-to-noise ratio of the device, by for example subtraction of the dark response from the response with light input.

In some embodiments, spectral calibration may be required to be performed only once, with the calibration data stored and applied over the operational lifetime of the spectrometer or wavelength multiplexor. This is possible because the wavelength discrimination element (the tapered waveguide) and the photodetector array may be closely integrated, negating significant drift in the instrument response with time. Furthermore, standard temperature-control techniques may be employed to negate temperature related drift.

In one embodiment, the instrument response of the tapered waveguide is treated as a bandpass filter exhibiting a principle spectral peak at a given out-coupling position, but with satellite peaks at shorter wavelengths due to the standing wave effects described above. In another embodiment, the instrument response of the tapered waveguide is treated as a short-pass filter. Such an approach takes advantage of the steep on-off transition and lack of satellite features on the long-wavelength side of the main spectral peak.

Referring to FIG. 13, waveguides disclosed herein may be formed by for example forming a multilayer stack 13 of light guiding layers, and delaminating the multilayer stack between at least two of the light guiding layers to form a waveguide (for example defining channel 15) between the light guiding layers.

Light in this document refers to radiation with a frequency capable of being channeled and separated in a tapered waveguide. Non-limiting examples of suitable radiation include visible frequencies, ultraviolet frequencies, and infrared frequencies. Transparent in this document refers to a property of a material that allows radiation of at least a desired wavelength (for example the wavelength corresponding to the mode cutoff thickness) to pass through the material. Increased transmissivity in this document refers to the fact that the waveguide at the region of increased transmissivity allows a larger percentage of light of at least a desired wavelength to be transmitted from the waveguide than does nearby regions of the waveguide at other positions along the waveguide. The increased transmissivity may only apply to wavelengths that are directed normal or near-normal to the channel. Near-normal refers to light rays travelling in a direction nearly perpendicular to the axis of the waveguide channel. The exact range of angles encompassed by this term depends on the application, for example the range of angles accepted by the particular angular-dependent transmission filter used or required.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims. The summary of what is disclosed and claimed to be new is in the claims.

The embodiment of the invention in which an exclusive property or privilege is claimed are defined as follows:

1. A tapered leaky waveguide, comprising:
   a first waveguiding layer and a second waveguiding layer having a core between the first waveguiding layer and the second waveguiding layer, each of the first waveguiding layer and the second waveguiding layer comprising an omni-directional reflector for light propagating in at least one leaky mode within the core;
   the core having a diminishing thickness in a first direction and having a selected thickness at a position at which light propagating in the tapered leaky waveguide forms a transverse resonant mode corresponding to a mode cutoff of a desired wavelength of light propagating within the core; and
   a light collection element disposed to receive light that, in operation of the tapered leaky waveguide, propagates perpendicular to the core at the position of the selected thickness.

2. The tapered leaky waveguide of claim 1 in which the core has converging sides in the first direction.

3. The tapered leaky waveguide of claim 1 in which the light collection element comprises a window in the first waveguiding layer.

4. The tapered leaky waveguide of claim 1 in which the tapered leaky waveguide is formed as a part of a multilayer stack of light guiding layers.

5. The tapered leaky waveguide of claim 1 in which the first waveguiding layer and the second waveguiding layer comprise at least one of one-dimensional, two-dimensional, and three-dimensional photonic crystals.

6. The tapered leaky waveguide of claim 1, in which the position of the selected thickness is a first position having a first selected thickness and the light collection element is a first light collection element, the leaky waveguide further comprising at least a second position having a second selected thickness spaced from the first position along the core in the first direction, and a second light collection element disposed to receive light that, in operation of the tapered leaky waveguide, propagates perpendicular to the core at the second position.

7. The tapered leaky waveguide of claim 1 in which the light collection element comprises a photodetector or photodetector array positioned to detect light passing from the core at the position of the selected thickness.

8. The tapered leaky waveguide of claim 7, further comprising at least one of an angular-dependent transmission filter and a low numerical aperture optic between the core and the photodetector or photodetector array.

9. The tapered leaky waveguide of claim 1 used as at least one of a spectrometer, wavelength shift sensor, on-chip optical network, absorption analyzer, fluorescence analyzer, and wavelength division multiplexor.

10. The tapered leaky waveguide of claim 1 used as a stationary transform spectrometer.

11. The tapered leaky waveguide of claim 1 further comprising a second waveguide optically coupled to the core at the position of the selected thickness.

12. The tapered leaky waveguide of claim 1 in which the first waveguiding layer and the second waveguiding layer form omni-directional reflectors for at least one state of light polarization within a specified wavelength band.

13. A waveguide, comprising:
   a multilayer stack of light guiding layers;
   the multilayer stack being delaminated in a patterned region between light guiding layers, the patterned region having converging sides, the waveguide being tapered along a waveguide length;
   in which the multilayer stack comprises an optical path normal to the waveguide at a position along the waveguide length corresponding to a selected thickness of the waveguide at which light propagating in the waveguide forms a transverse resonant mode corresponding to a mode cutoff of a desired wavelength of light propagating within the waveguide; and
   a light collection element disposed to receive light that, in operation of the waveguide, propagates perpendicular to the waveguide at the position of the selected thickness.

14. The waveguide of claim 13 in which the optical path is at least partially transparent to light of a desired wavelength.

15. A method of light transmission, the method comprising:
   providing a first waveguiding layer and a second waveguiding layer with a core between the first waveguiding layer and the second waveguiding layer, each of the first waveguiding layer and the second waveguiding layer comprising an omni-directional reflector for light propagating in at least one leaky mode within the core, in which the core has a diminishing thickness in a first direction and having a selected thickness at a position at which light propagating in the tapered leaky waveguide forms a transverse resonant mode corresponding to a mode cutoff of a desired wavelength of light propagating within the core;
   propagating light within the core, the light having the desired wavelength; and
   collecting light propagating perpendicular to the core at the position of the selected thickness.

* * * * *